(12) United States Patent
Adams et al.

(10) Patent No.: US 12,118,114 B2
(45) Date of Patent: Oct. 15, 2024

(54) MULTICOMPUTER PROCESSING TO PROTECT DATA FROM UNAUTHORIZED MODIFICATION

(71) Applicant: Equity Protect Inc., Reno, NV (US)

(72) Inventors: James G. Adams, Reno, NV (US); Ryan S. Marshall, Reno, NV (US)

(73) Assignee: Equity Protect Inc., Reno, NV (US)

( * ) Notice: Subject to any disclaimer, the term of this patent is extended or adjusted under 35 U.S.C. 154(b) by 0 days.

(21) Appl. No.: 18/411,626

(22) Filed: Jan. 12, 2024

(65) Prior Publication Data

US 2024/0273224 A1 Aug. 15, 2024

Related U.S. Application Data

(60) Provisional application No. 63/484,595, filed on Feb. 13, 2023.

(51) Int. Cl.
G06F 21/62 (2013.01)

(52) U.S. Cl.
CPC .............................. *G06F 21/6218* (2013.01)

(58) Field of Classification Search
None
See application file for complete search history.

(56) References Cited

U.S. PATENT DOCUMENTS

| | | |
|---|---|---|
| 2009/0276622 A1 | 11/2009 | Matsuo |
| 2010/0023759 A1 | 1/2010 | Langer |
| 2017/0230176 A1 | 8/2017 | Princen et al. |
| 2017/0264600 A1* | 9/2017 | Froelicher ........... H04L 63/0823 |
| 2018/0254900 A1 | 9/2018 | Princen et al. |
| 2019/0333142 A1 | 10/2019 | Thomas |
| 2020/0042989 A1 | 2/2020 | Ramadoss et al. |
| 2020/0175623 A1 | 6/2020 | Howie |
| 2021/0344482 A1 | 11/2021 | Bygrave et al. |
| 2022/0417028 A1 | 12/2022 | Zilbershtein et al. |
| 2024/0005397 A1 | 1/2024 | Jette et al. |

* cited by examiner

*Primary Examiner* — Brandon Hoffman
(74) *Attorney, Agent, or Firm* — Knobbe, Martens, Olson & Bear LLP

(57) ABSTRACT

An aspect relates to generation of a secure token based on encrypted and/or hashed data associated with a user and/or an asset, and recording the secure token on a distributed database. An encrypted communication may be received from a user device, the communication comprising an instruction to remove security content from a third party database record, the security content stored in association with a first asset, the security content configured to inhibit recording of at least a first document type in association with the first asset. In response to the instruction, generating the security content and causing the security content to be recorded in association with the first asset.

24 Claims, 24 Drawing Sheets

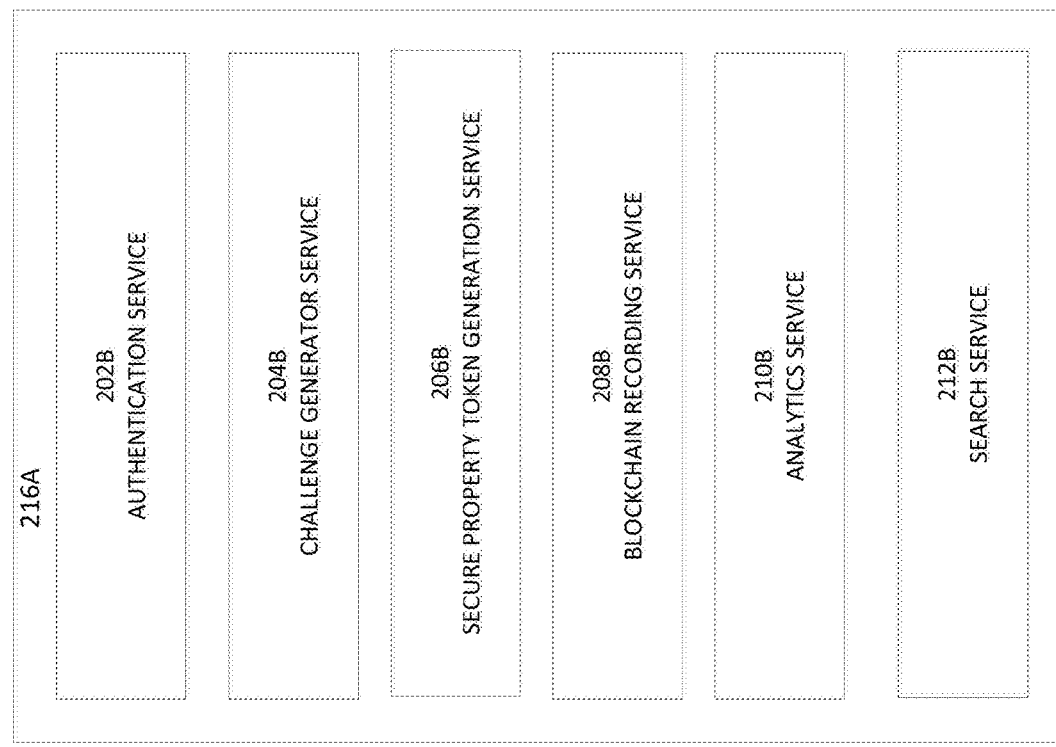

FIG. 6A

House information

Nibh eget tempor, quis consectetur neque, diam justo?

Answer

Tempor, sit purus at pharetra, ut viverra odio?

Ut elit sed velit enim leo aliquet quis?

Select

Amet ut in elit parturient. Vitae dictumst in sed?

Elit orci id dignissim arcu nec volutpat quam?

Sed id sed tristique mollis risus risus?

Select

Viverra volutpat ante ultricies non sagittis?

● Yes ○ No

FIG. 6E

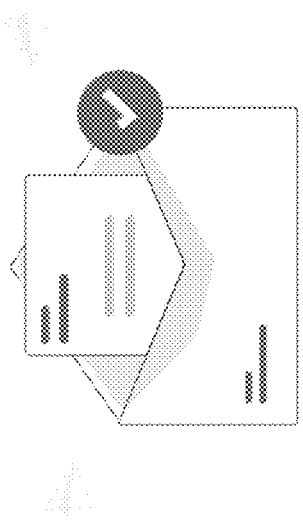
FIG. 6F

Account settings

You can view or download your information and delete your account at any time.

Your account information

Download a copy of your information to keep, or to transfer to another service.

View and manage your information and some settings.

Learn more about how you can manage your information.

Deactivating or deleting your account

I no longer own the property protected by equityprotect™

I no longer want to have my property protected by equityprotect™

FIG. 6H

Latest Properties

Filter your results ▾    Selection actions ▾

- ✎ Edit
- ◇ Move
- 🗑 Delete

| Address | State | Zip | Type | Built | Sold | Owner | |
|---|---|---|---|---|---|---|---|
| 417 Bicetown Road | NY | 19126 | RSFR | 1979 | 2016 | Kenneth Allen | 6 (2 pending) |
| 3274 Doe Meadow Drive | MD | 20701 | RSFR | 1900 | 2022 | Autumn Phillips | 6 |
| 970 Ersel Street | TX | 75006 | RSFR | 2011 | 2016 | Stephanie Sharkey | 23 |
| 3831 Cedar Lane | MA | 02143 | RSFR | 2000 | 2016 | Jerry Helfer | 1 |
| 1456 Veltri Drive | AK | 99502 | RSFR | 1968 | 1978 | Joshua Jones | 27 |
| 1341 Poplar Street | IL | 60606 | RSFR | 1979 | 1999 | Patricia Sanders | 7 |
| 4130 Butternut Lane | IL | 62002 | RSFR | 1890 | 2016 | Stephanie Nicol | 6 (2 pending) |
| 2825 Winding Way | RI | 02908 | RSFR | 2022 | 2022 | David Elson | 8 |

Kim Richards
BROKER COMPANY, LLC
(273) 555-2219
kim@brokercompany.com
4525 Saints Alley
Plant City, FL 33564

184 Griffin Street, Gilbert, AZ 85233

| General | Documents | Owners | Location | Tax | Finance | Foreclosure |
|---|---|---|---|---|---|---|

| Record date | Sale Price | Deed Type | Doc. # | Buyer / Seller | | |
|---|---|---|---|---|---|---|
| Sep 8, 2022 9:03 pm | $ 1,912,200 | Some sort of claim | 2330210 | A Huge Family Trust / Kenneth Allen | | ⚙ |
| Sep 8, 2022 9:03 pm | $ 1,912,200 | Some sort of claim | 2330210 | A Huge Family Trust / Kenneth Allen | | ⚙ |
| Sep 8, 2022 9:03 pm | $ 1,912,200 | Some sort of claim | 2330210 | A Huge Family Trust / Kenneth Allen | | ⚙ |
| Sep 8, 2022 9:03 pm | $ 1,912,200 | Some sort of claim | 2330210 | A Huge Family Trust / Kenneth Allen | | |

- View
- Share
- Reorder

FIG. 7H

184 Griffin Street, Gilbert, AZ 85233

| General | Documents | Owners | Location | Tax | Finance | Foreclosure |

APN: 089-641-82
Percent Improved: --
Legal Description: N-TRACT: 6574 BLOCK: LOT: 78
Lot: 78
Tax area: 18014
Assessed Value: 403862
Percent Improved: -%

FIG. 71

Download your information

Massa mauris dui volutpat nunc. Id velit massa tristique turpis aenean porta fam

- Your stored data, including images, documents, and other files
- Your property list, settings and everything related
- Your contacts list, address book, company information
- Overview of your account, including saved data and templates
- Any other data you want HTML Format gabriel.taudor@gmail.com

FIG. 7J

MULTICOMPUTER PROCESSING TO PROTECT DATA FROM UNAUTHORIZED MODIFICATION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND OF THE INVENTION

Field of the Invention

The present disclosure generally relates to using networking multicomputer processes and encrypted tokens to inhibit malicious modification of sensitive data.

Description of the Related Art

Electronic databases are increasingly essential for storing sensitive data, such as property titles. Thus, security of such data is of high importance. Nonetheless, many current databases fail to adequately prevent the improper modification of such data or storing of records.

Thus, it would be advantageous to provide systems configured to efficiently enhance data security and to inhibit the improper modification of or addition of data.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

BRIEF DESCRIPTION OF THE DRAWINGS

Embodiments will now be described with reference to the drawings summarized below. These drawings and the associated description are provided to illustrate example aspects of the disclosure, and not to limit the scope of the invention.

FIG. 2B illustrates example modules and services of the record security and encryption system.

DETAILED DESCRIPTION

Figure 1:
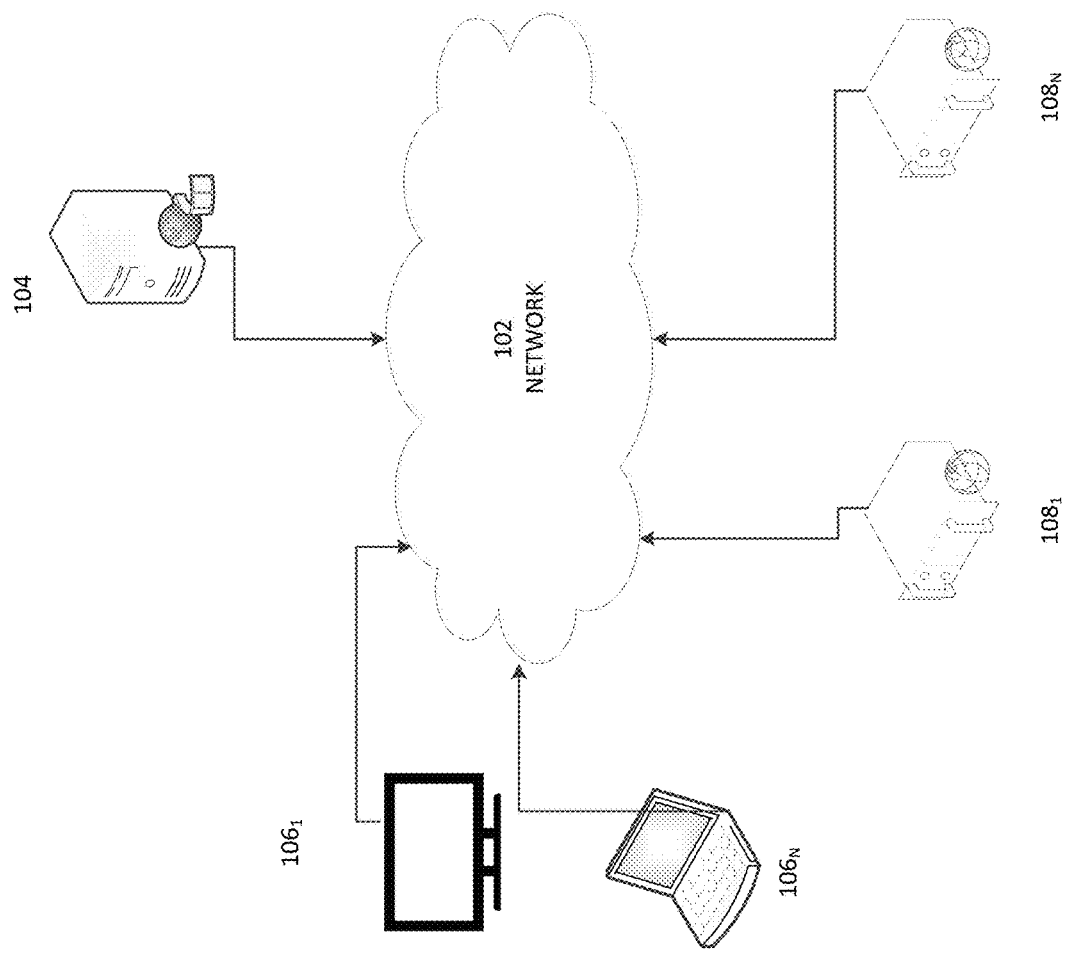
FIG. 1 illustrates an example environment.

An aspect of the present disclosure relates to multicomputer systems and processes configured to inhibit malicious modification of sensitive data, including malicious addition of data (e.g., related to real property ownership, where real property may be referred to as a physical asset herein). Another aspect relates to using biometric data, a unique identification document (e.g., a driver's license or passport), and/or an encrypted token to authenticate a user.

By way of context, title to (ownership of) an item of real property may be evidenced by a physical and/or digital legal document, such as a deed. The title may be transferred via a deed. During a property transfer process or loan process, a title search may be performed to verify the property's legal owner as well as what debts are owed against the property (e.g., whether there are security interests, such as liens recorded against the property). The foregoing data may be used to generate a title abstract. The title abstract may be used to determine if the property has a clear title, which means the seller has the right to transfer the property. Thus, for example, if a security interest is filed against the title, the property title owner may be prevented or inhibited from transferring title to another (e.g., because a lender may refuse to provide a mortgage loan until the security interest is removed (e.g., terminated by recording a security interest termination document against the security interest) or subordinated to the mortgage loan, and the title is clear; or because a government official, such as an examiner, may refuse to record the transfer until the titled is cleared).

Another aspect of the present disclosure relates to generating a unique digital, encrypted and/or hashed fingerprint (referred to as a secure property token) for a physical asset, such as an item of real property. The secure property token may be generated based on a combination of some or all of the following: current physical asset ownership, a chain or history of previous physical asset owners (e.g., all previous owners or the last threshold number of previous owners, such as the last 3 or 5 owners), transfer dates of the physical asset and the corresponding grantors and grantees, respective encumbrances (e.g., loans) recorded against such physical asset and associated dates, assignments, recorded reconveyances, current physical asset title vesting, a physical asset legal description, and/or some or all liens (e.g., recorded liens) affecting the physical asset. For example, some or all of the foregoing data may be hashed using user biometrics, other unique identifying data of the current owner and/or secondary two factor authentication of the actual, legal, owner, thereby creating a unique and proprietary asset.

The secure property token, comprising the hashed data, may be recorded on a distributed, synchronized database (e.g., a distributed ledger, such as a blockchain), and may be used to certify authenticity and ownership of the physical real property. Access may be shared with third party service providers, such as insurers which may provide corresponding insurance and/or with trusted referral partners. Advantageously, the unique secure property token may optionally not be counterfeitable, substituted or subdividable, thereby providing enhanced security.

After the secure property token is created, the record security and encryption system may periodically and/or in response to a detected event, unlock and update the secure token with current information (e.g., an assignment of mortgage, a reconveyance, and/or the like) and may record the updated secure property token on the distributed synchronized ledger (e.g., a blockchain). The record security and encryption system may periodically (e.g., monthly, quarterly, or yearly) recertify the secure token to verify that it is up to date. Thus, the secure property token may be later accessed to reliably determine an extensive history of the real property, including transfers, mortgages, other security interests, security interest terminations, and the like.

An example of an important type of data stored in databases relates to the title for real property (e.g., sometimes referred to as a database of the county office that holds the county real estate records for the property, a title database or an assessor database). A property title is a legal term for ownership of a property. The title may be evidenced by a physical document, such as a deed. An increasingly common form of fraud involves a scammer recording a false quitclaim deed in a real property record, purporting to transfer ownership of a item of real property from the actual owner to the scammer. The scammer may then take a loan out on the real property, and the lender may then record a lien in the database. It may be a lengthy and expensive process to have the title record corrected and to have the quitclaim deed and lien removed.

Certain technical solutions are described herein that utilize the secure property token (e.g., comprising hashed user and/or real property data) to overcome the technical challenges posed by security deficits of databases, such as title database, to enable a property owner to inhibit the improper recording of documents and ownership interests in a property title record, and to enable the recording of authentic documents and ownership interests in a property (e.g., permitted business activity, such as new loans taken out by the actual owner, property transfers by the actual owner, etc.).

Certain example aspects will now be discussed with reference to the figures. FIG. 1 illustrates an example computer networked environment. A computerized record security and encryption system 104 comprises one or more servers and a network interface via which the record security and encryption system is connected to a network 102 (e.g., a wide area network, the Internet, a local area network, and/or other network). The record security and encryption system 104 is configured to communicate over the network with client devices $106_1 \ldots 106_n$ (e.g., smartphones, laptops, desktops, game consoles, connected televisions, streaming devices that connect to televisions or computers, networked wearables, and/or the like, associated with respective users). A client device 106 (which may be referred to herein as a user device) may host a browser (which may be used to access, from a remote server, such as the record security and encryption system 104, and render user interfaces and data described herein, and to enable a user to provide data and instructions) and/or a record control application (e.g., an "app" downloaded from an application ("app") store to the client device for execution that provides functionality described herein). The record security and encryption system 104 may provide and/or populate user interfaces, such as those described herein.

The system 104 may store property and user records, where a given user record (e.g., an account record) may include some or all of the following data: user profile data (e.g., a user name, age, email address, physical address, phone number, and/or texting address), a level of service subscribed to (e.g., a title watch service and/or other services) portfolio data (e.g., for real property owned by the user, such as the property address), property title and loan data (current and previous owners, years of acquisition, first mortgage lender, second mortgage lenders, original loan amount, etc.), challenge questions (or identifiers thereof) and challenge question answers (which may be used to determine whether a given user actually owns a given property), various documents and/or other user-related data described herein. For example, the documents may include annual certifications (e.g., for the property title, valuation, tax bills, previous sale disclosures), recorded grant deed, recorded deeds of trust and reconveyances (when applicable), recorded UCC filings (and archives thereof), security interest (UCC) termination notices (and archives thereof), subordination agreements (and archives thereof), the record security and encryption system service agreement, property floor plan (e.g., in vector and/or digital form), and/or the like. Some or all of the user record may be encrypted and access may be limited to certain authorized administrators, partners, and/or service providers to enhance security and privacy.

Optionally, the record security and encryption system 104 may transmit to and/or access information from one or more governmental and/or private database systems $108_1 \ldots 108_n$. For example, the database systems $108_1 \ldots 108_n$ may optionally include title record systems, loan systems, lien systems, property assessment systems, credit rating systems, and/or the like. The record security and encryption system 104 may access some or all of the real property related data discussed herein from one or more database systems $108_1 \ldots 108_n$. The record security and encryption system 104 may provide a search engine via which users can search for a given property record using one or more search terms, such as address, lender, owner, lien holder, and/or other such data. If the search engine finds a match the corresponding property records (and some or all of the property record data) may be transmitted for display on a client device.

Figure 2A:
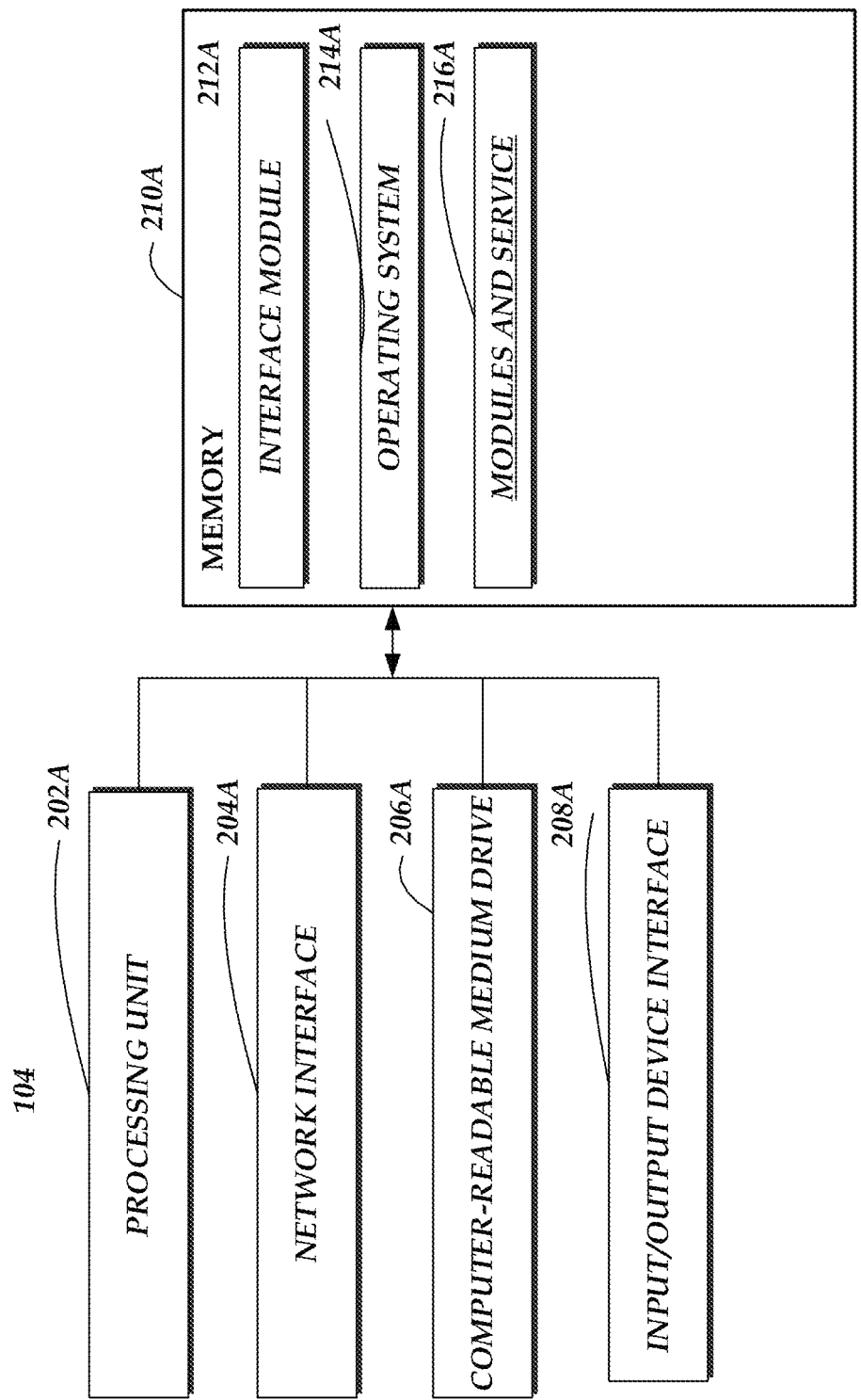
FIG. 2A is a block diagram illustrating example components of a database record security and encryption system.

FIG. 2A is a block diagram illustrating example components of a record security and encryption system 104. The example record security and encryption system 104 includes an arrangement of computer hardware and software components that may be used to implement aspects of the present disclosure. Those skilled in the art will appreciate that the example components may include more (or fewer) components than those depicted in FIG. 2A. The record security and encryption system 104 may optionally be a cloud-based system including a hosted computing environment that includes a collection of physical computing resources that may be remotely accessible and may be rapidly provisioned as needed. Further, the record security and encryption system 104 may include or utilize a hosted storage environment that includes a collection of physical data storage devices that may be remotely accessible and may be rapidly provisioned as needed (sometimes referred to as "cloud" storage). Such cloud storage may be utilized to store some, or all of the data, programs, and/or content described herein. Some or all of the data stored therein may be encrypted. The encryption key(s) may optionally be stored on a system separate from the encrypted data to thereby enhance security.

The record security and encryption system 104 may include one or more processing units 202A (e.g., a general-purpose processor, an encryption processor, a video transcoder, and/or a high-speed graphics processor), one or more network interfaces 204A, a non-transitory computer-readable medium drive 206A, and an input/output device interface 208A, all of which may communicate with one another by way of one or more communication buses. The network interface 204A may provide the various services described herein with connectivity to one or more networks (e.g., the Internet, local area networks, wide area networks, personal area networks, etc.) and/or computing systems (e.g., database systems, client devices, service provider systems, partner systems, etc.). The processing unit 202A may thus receive information, content, and/or instructions (such as described herein) from other computing devices, systems, or services via a network, and may provide information, content (e.g., streaming video content, data, files, documents, etc.), and instructions to other computing devices, systems, or services via a network. The communications over the network may optionally be encrypted (e.g., using Transport Layer Security) to encrypt a request's URL, query parameters, headers, cookies, and/or other data. Optionally, HTTP Strict Transport Security (HSTS) may be utilized to further protect network communications from man-in-the-middle attacks (e.g., protocol downgrade attacks, and/or cookie interception and modification).

The processing unit 202A may also communicate to and from non-transitory computer-readable medium drive 206A and memory 210A and further provide output information via the input/output device interface 208A. The input/output device interface 208A may also accept input from various input devices, such as a keyboard, mouse, digital pen, touch screen, microphone, camera, etc.

The memory 210A may contain computer program instructions that the processing unit 202A may execute in order to implement one or more aspects of the present disclosure. The memory 210A generally includes RAM, ROM and/or other persistent or non-transitory computer-readable storage media. The memory 210A may include cloud storage. The memory 210A may store an operating system 214A that provides computer program instructions for use by the processing unit 202A in the general administration and operation of the modules and services 216A, including its components. The modules and services 216A are further discussed with respect to FIG. 2B and elsewhere herein. The memory 210A may further include other information for implementing aspects of the present disclosure.

The memory 210A may include an interface module 212A. The interface module 212A can be configured to facilitate generating one or more interfaces through which a compatible computing device may send to, or receive from, the modules and services 216A.

The modules or components described above may also include additional modules or may be implemented by computing devices that may not be depicted in FIGS. 2A and 2B. For example, although the interface module 212A and the modules and services 216A are identified in FIG. 2B as single modules, the modules may be implemented by two or more modules and in a distributed manner. By way of further example, the processing unit 202A may optionally include a general-purpose processor and may optionally include a graphics processor, encryption processor, and/or a blockchain accelerator.

The system 104 may offload certain compute-intensive portions of the modules and services 216A (e.g., mathematical calculations performed when mining coins on a blockchain or encryption operations) to one or more dedicated devices, such as a graphics processor unit (GPU), a blockchain accelerator, an encryption process while other code may run on a general-purpose processor. The processing unit 202A may include hundreds or thousands of core processors configured to process tasks in parallel. A GPU may include high speed memory dedicated for graphics processing tasks. As another example, the system 104 and its components can be implemented by network servers, application servers, database servers, combinations of the same, and/or the like, configured to facilitate data transmission to and from data stores, user terminals/devices, and third-party systems via one or more networks, such as those described herein. Accordingly, the depictions of the modules are illustrative in nature.

The modules and services 216A may include modules and components that, with reference to FIG. 2B, provide an authentication service 202B, a challenge question generator service 204B, a secure property token generation service 206B, a blockchain recording service 208B, and an analytics service 208B.

The authentication service 202B may authenticate a user (e.g., a property owner, a service provider, and/or other user described herein) attempting to log in to a user account and/or attempting to modify and/or attempting to modify the user profile or property profile (e.g., attempting to unlock or lock a property title). For example, authentication may be performed via a user identifier, password, biometrics, two factor authentication, and/or otherwise. By way of illustration, the two factor authentication may take the form of a token/code and a response to a phone call. For example, an automated interactive voice assistant system may call the user via a telephonic channel at a number/destination specified by the user during the account creation or modification process, and that is stored in the user's profile During the call, the user may be prompted to speak or key-in the token/code (e.g., a 6 digit code or code of other length) that had been provided to the user over an encrypted channel (e.g. using HTTPS) during the account creation process and/or at a later time (e.g., via an email directed to an email address or a message directed to a messaging address stored in the user profile). The token/code may have been generated using some or all of the information used to generate the secure property token described herein, and may be hashed and/or encrypted.

The code/token may be bound to a core data object comprising the current legal vesting of the real property, a legal description of the real property, a property history (e.g., a 10 year, 20 year, or 30 year property history) including some or all grantor/grantee deeds (e.g., of previous owners) for the real property, loan records associated with the real property, certifications (e.g., annual certifications) of the real property, current tax bills for the real property, floor plan for the real property (e.g., from a valuation report), an encrypted emergency key (e.g., a 6-digit key), beneficiaries identified for the real property, a binary copy of a government issue identifier, a biometric facial print and/or fingerprint, and/or other user and/or property-related data discussed herein.

The challenge question generator service 204B may generate questions to be used in authenticating a user and/or in determining whether a user actually owns an item of real property that the user is attempting to add to a user property profile and/or is attempting to have the title security services applied to. As described elsewhere herein, the questions may be generated by a natural language processor based on information accessed from database records for the property identified/selected by the user and/or on user-provided information for the property. The user may need to answer all or a threshold number of challenge questions (e.g., 4 out of 5 challenge questions) in order for the real property to be added to the user's property portfolio and/or to make certain modifications (e.g., unlock or lock a real property title, subordinate a security interest, etc.). Optionally, if the user successfully answers the challenge questions, the system may generate and transmit (e.g., via an email directed to an email address or a message transmitted to a messaging address stored in the user profile) a one-time use code that may only be used for the current session. A session may comprise a series of contiguous actions by a single instantiation of a browser on an individual website within a specified period. The user may then need to enter the one-time use code into a corresponding field during the session (and the system needs to determine it received the enter code) in order for the system to enable the user to add the property to the user's property portfolio and/or in order for the user to perform certain operations (e.g., unlock or lock a property title). If the user does not enter the one-time code during the session, the user may be prevented from performing certain actions.

The secure property token generation service 206B may generate a secure property token, as described elsewhere herein. For example, the secure property token generation service 206B may generate a secure property token based on a combination of some or all of the following: current physical asset ownership, a chain or history of previous physical asset owners (e.g., all previous owners or the last threshold number of previous owners), transfer dates of the physical asset and the corresponding grantors and grantees, respective encumbrances (e.g., loans) recorded against such physical asset and associated dates, assignments, reconveyances, current physical asset title vesting, physical asset legal description, and/or some or all lien matters affecting the physical asset. Some or all of the foregoing data may be hashed or encrypted by the secure property token generation service 206B using user biometrics or other unique identifying data of the current owner creating a unique and proprietary asset.

The secure token, comprising the hashed and/or encrypted data, may be recorded by the blockchain recording service 208B on a blockchain network or other distributed, synchronized ledger, enabling the secure token to be used to certify authenticity and ownership of real property. Access may be shared with certain partners or third party service providers, such as insurers which may provide corresponding insurance or other services. Advantageously, the unique secure property token may optionally not be counterfeitable, substituted or subdividable, thereby providing enhanced security.

The analytics service 210B may generate analytics and reports, as described elsewhere herein.

In addition, a search service 212B may be provided via which users (e.g., consumer, partner, and/or service provider users) can search for a given property record via a search engine using one or more search terms, such as address, lender, owner, lien holder, and/or other such data, and/or using filters. If the search engine finds a match, the corresponding property records (and some or all of the property record data) may be transmitted for display on a client device.

As discussed elsewhere herein, a secure property token may be securely recorded on a distributed synchronized database (e.g., a distributed ledger), such as a blockchain. For further security, the distributed ledger may be permission based, where only identified and optionally vetted users may have access to the blockchain network.

The permission-based blockchain may operate under a governance model comprising policies (e.g., established by a consortium that configured the network or later modified) that enhances trust in the blockchain operation. For example, the policies may specify which organizations can access or update the blockchain network, and may provide a mechanism to enforce such policy decisions. A given policy may identify organizations that are authorized to have access to a given resource, such as a user or system chaincode (e.g., a program, such as a smart contract, which may be written in Go, node.js, or Java, that implements a prescribed interface and that may handle business logic). The policies may optionally specify the number of participants or organizations needed to approve a proposal to update a given resource, such as a channel or chaincode. The blockchain network policies may evaluate the collection of signatures attached to transactions and proposals and validate if the signatures fulfill the governance agreed to by the network.

Further, by relying on the known identities of the participants, the permission blockchain may optionally utilize crash fault tolerant (CFT) or byzantine fault tolerant (BFT) consensus protocols, rather than the more compute intensive (and more expensive) blockchain mining. Thus, utilizing a permission-based blockchain enables a reduction in computer resource (e.g., processor, network, and memory) utilization.

By way of example, the permission-based blockchain may utilize enrollment certificates to verify the identities of participants and may use TLS certificates for network node and client communications. TLS communication can use both one-way (server only) and two-way (server and client) authentication.

Another technical advantage in utilizing a permission-based blockchain is that the risk of a participant introducing malicious code (e.g., through a smart contract or other chaincode) may be significantly reduced. For example, participants in the permission-based blockchain are identified to each other, and actions, such as submitting software application transactions, modifying the blockchain network configuration, or deploying chaincodes, are recorded on the blockchain (e.g., following an endorsement policy that was established for the network and relevant transaction type). Thus, because participants are not completely anonymous, a participant that introduces malicious code (e.g., malware, such as a virus) can be quickly identified and the incident handled in accordance with the terms of the blockchain governance model.

Figure 3:
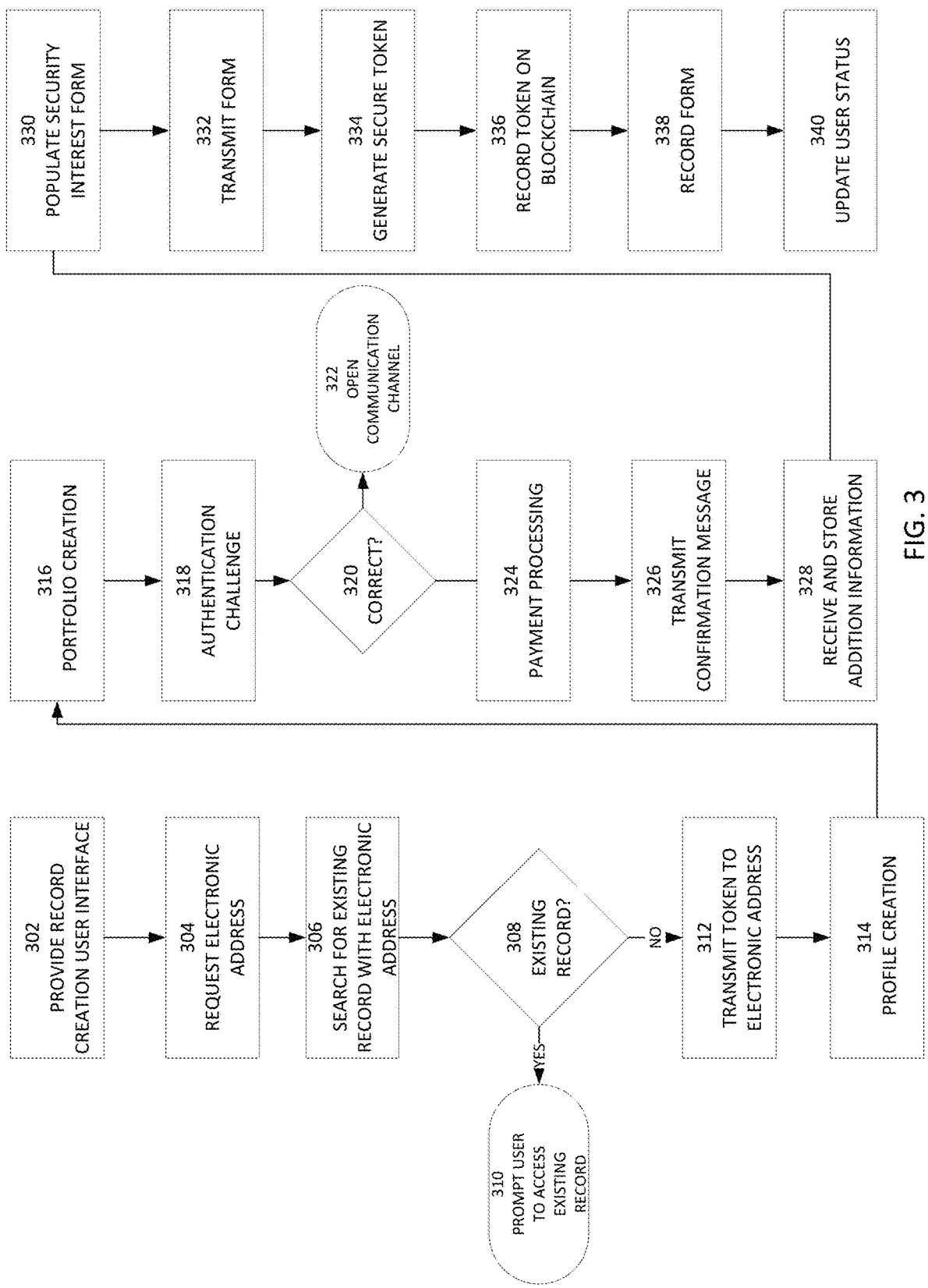
FIGS. 3-5 illustrate example processes.

FIG. 3 illustrates an example record creation process. The process may be executed using the record security and encryption system, a user device, or partially by the record security and encryption system and the client device. At block 302, a user may access an account record creation user interface (e.g., provided via a web server or via a dedicated application hosted on the user device), from a link in an email from a link in a website ad, or otherwise) via a user device. A determination may be made as to whether the user was referenced to the record security and encryption system site by another entity, such as a referring partner, and if so, a corresponding referral indicator may be stored in memory. A user may be provided with options to enroll up for different levels of service, such as a title watch service, or a title watch service with additional services, such as title insurance, discounts for certain services, etc. A user may be provided the option to subscribe to one or more of the services for a specified recurring period of time (e.g., monthly, yearly, and/or the like). Optionally, targeted content may be provided to the user via a user interface served by the record security and encryption system. For example, the targeted content may be selected based on the IP address of the user, a referral source for the user, and/or the like. Optionally, different targeted content may later be presented to the user based on a type of real property the user is adding to a property portfolio (e.g., a private house, a condominium, a rental property), the location of the real property, an age of structures included in the real property, and/or a valuation of the real property.

At block 304, the user may be prompted, via a user interface presented on the user device, to provide one or more electronic addresses associated with the user (e.g., email address, mobile phone number, instant messaging address, and/or the like).

At block 306, in order to prevent the creation of duplicate account records, at block 308 and so reduce memory utilization and enhance security, the electronic address may be used in a database search query to search for existing records associated with the electronic address.

At block 310, if an existing record associated with the electronic address is identified, the user may be prompted to login to an existing account associated with the matching record and/or to request a password reset. If the user requests a password reset, a link may be transmitted to the user's electronic address, which when activated, causes a user interface to be presented via which the user can create a new account password.

At block 312, if the electronic address is not associated with an existing account record, a message comprising a digital token may be transmitted to the electronic address provided by the user. In response to the user activating the token (e.g., by clicking on, tapping on, or otherwise selecting the token), at block 314, a profile creation user interface may be presented on the user device and user inputs may be received from the user device.

The user interface may include fields via which the user may create a password, enter the user's name (e.g., first and last names), mobile phone number, and/or a recovery electronic address (e.g., a recovery email address or mobile phone address, where if the user requests that the account password be reset, a code may be transmitted to the electronic address which the user needs to enter into a corresponding field in order to reset the password).

At block 316, a property portfolio creation user interface is presented on the user device. A control may be provided via which the user can add a physical asset (e.g., an item of real property, such as a house) to a new or existing portfolio by activating an "add" control. In response to the user activating the add control, a field may be presented configured to receive a user text entry of a real property physical address. Optionally, as the user types in the address, the process incrementally identifies, from a data store of addresses, matching addresses from which the user can select. Once the user selects a matching address, the process proceeds. This technique reduces user entry time, while at the same time reducing the possibility of data entry errors. If no matching property is found, the user may manually enter the entire address. If a match is still not found, a live chat user interface may automatically be presented and a communication session may be established between the user and a support person to attempt to enter the correct address. If the correct address is not resolved, the account record may still be generated with an incomplete indication and without adding a property to the user's property portfolio.

At block 318, if a single property was identified or selected, the user may be prompted to provide authentication data to prove that the user owns the identified property. For example, the user may be prompted to respond to one or more challenge questions from a set of challenge questions, and provide corresponding answers. Optionally, the answers to the questions may be automatically populated from data accessed from one or more data stores (e.g., government and/or private data stores that store property and/or loan related data, such as those described herein).

Advantageously, the questions may optionally be generated by a natural language processor (e.g., an artificial intelligence robot (AI bot)) based on information accessed from database records (e.g., property title databases, lien databases, property assessment databases and/or other data stores) for the property identified/selected by the user. For example, a dialogue-based AI chatbot may be utilized that is configured to understand natural human language and database records and to generate human-like questions (e.g., text or voice questions). The AI bot may be trained using a large dataset.

Example questions may include one or more of the following:
Who was your original 1st mortgage lender?
What was your original loan amount?
What was the seller's last name when you acquired the house?
What was the year you acquired this home?

At block 320, when authenticating the user and determining whether the user owns the identified property, a determination is made as to whether the user answered the challenge question(s) correctly (e.g., all the challenge questions, or at least threshold number of challenge questions, where the threshold is less than all the challenge questions). If the user did not answer the challenge questions correctly, at block 322, a communication interface (e.g., a chat user interface) may optionally be automatically launched, and the user may be prompted, via a text prompt presented in the communication interface to request assistance. Optionally, when a user has more than one property in their profile, the challenge questions are only presented if a comparison of the mailing address of the real property in the profile with the mailing address of the selected address does not match.

At block 324, the user may be prompted to provide payment information (e.g., credit card number, name on card, expiration date, and/or pin) to create a payment profile the received information may be stored in the user account record. Optionally, the mailing address for the credit card is prepopulated with the real property address, and the user is enabled to edit the address. The billing amount for the subscription may be confirmed via a payment gateway, and if the billing is successful, the billing profile may be bound to the user profile.

At block 326, a message may be transmitted to the user (e.g., via a webpage, an application user interface, an email, a messaging service message, and/or otherwise) confirming the subscription and optionally providing information regarding the subscription (e.g., the subscription cost, length, and services provided). Optionally, the user may be provided, via a user interface, with an option to enhance the subscription with additional products and/or services (e.g., title insurance).

Optionally, at block 328, the user may be prompted to provide additional information, such as biometric data, other authentication data, and/or insurance data (e.g., via corresponding user interfaces). For example, the user may be prompted to upload an image of a government identifier (e.g., a driver's license, a state identifier, a passport, etc.) and/or provide data from their government identifier (e.g., a driver's license number, a passport number, etc.). In addition or instead, the user may be prompted to register their face and/or fingerprint to be used for future authentication. For example, a user may be prompted to upload a photograph of the user or capture an image of the user using a camera of a user device. This image and/or data obtained from the image (e.g., by converting the facial features into vectors, and/or metadata associated with the image) may be stored in association with the user account record. The government identifier and/or facial image and/or image data may be utilized for future authentication of the user and/or to generate a token (e.g., a secure property token comprising encrypted and/or hashed data), which may optionally be recorded on a distributed synchronized ledger, such as a blockchain.

In addition, the user may be prompted to provide insurance data (e.g., an insurance carrier name, a policy number, an initiation date, and/or other data) for title insurance for the property, for homeowner's insurance, and/or other property-related insurance. The insurance data may be stored in association with the user account record. The user may optionally be prompted to provide an online signature (e.g., a digital signature, a user tracing a signature on a touch input device, etc.), which may be stored in association with the user account and used to certify the user's agreement to the terms and conditions of the user of the services and tools described herein. The user may optionally be prompted to list beneficiaries of the user's account which may be stored in association with the user account. For example, in the event of the user's death, a beneficiary may be enabled to take over or terminate the user's account or the security interest recorded by the record security and encryption system in order to lock the title. Optionally, in order for a beneficiary to take over or terminate the user's account and/or security interest, the beneficiary may be required to provide an original or copy of a legal, official death certificate and/or a notarized affidavit instructing that the account (e.g., the account subscription) and/or security interest locking the title be terminated.

At block 330, an item of security interest content, in the form of a security interest document (e.g., a UCC-1 form template) may be accessed and automatically populated with property data (e.g., provided by the user and/or accessed from a government or private database, such as described herein) and lien data. A UCC-1 filing is a legal form that conventionally a creditor files to secure its interest in a borrower's property used as collateral for a loan. The filing serves as a public notice that the creditor has the right to take possession of the property as repayment on the underlying debt if the loan is not paid. However, in this instance, the security interest may be recorded solely to prevent or inhibit someone from committing fraud by functionally locking the title as described elsewhere herein. Thus, the process will record the UCC form against the property in a database (e.g., a secretary of state database and/or with the database of the county office that holds the county real estate records for the property, which may be referred to as the county recorder database) to prevent a person from committing fraud by recording a transfer of title for the property to the person. For example, the UCC form may be populated with "debtor" name (which in this instance in actually an entity associated with the operator of the record security and encryption system executing the current process to protect the user's property against fraudulent actions), the name and address of the property owner of record, and a description of the property (e.g., the address of the real property, a lot identifier, and/or other data).

At block 332, the populated UCC form may be transmitted to the user device for review, correction, and signature by the user, and the (optionally corrected) and signed UCC filing may be stored in memory.

At block 334, the secure property token is generated. As similarly discussed elsewhere herein, the secure property token may be generated based on a combination of some or all of the following: current physical asset ownership (e.g., the name of the user that owns the property), a chain or history of previous physical asset owners (e.g., all previous owners or the last threshold number of previous owners, such as the last 3 owners), transfer dates of the physical asset and the corresponding grantors and grantees, respective encumbrances (e.g., loans) recorded against such physical asset and associated dates, assignments, reconveyances, current physical asset title vesting, physical asset legal description, and/or some or all lien matters affecting the physical asset. By way of example, some or all of the foregoing data may be obtained from one or more public or private databases, such as the country recorder database or a secretary of state database.

Optionally, some or all of the foregoing data may be encrypted and/or hashed with user biometrics (e.g., vectors generated from the image of the user's face), other unique identifying data of the current owner (e.g., a driver's license number or other identifier) and/or other authentication data of the user (the actual, legal, property owner) creating a unique secure property token.

At block 336, the secure property token may be recorded on a distributed ledger (e.g., a blockchain or other distributed synchronized database), and so may be used to certify authenticity and ownership of the physical asset. Access may be shared with third party service providers, such as insurers which may provide corresponding insurance. Advantageously, the unique secure property token comprising encrypted and/or hashed data may optionally not be counterfeitable, substituted or subdividable, thereby providing enhanced security.

At block 338, the populated UCC form may be recorded in one or more databases (e.g., a county recorder database, a secretary of state database, and/or other database) as a security, thereby acting as a lock on the title as the title cannot be transferred until and unless the security interest is removed (e.g., deleted or terminated by recording a security interest termination document) or subrogated. The recorded UCC form may be uploaded/added to the user's profile. As discussed herein, the user (e.g., the current owner of the property) may "unlock" the title by instructing that the security interest be removed (e.g., deleted or terminated for the purpose of taking out a mortgage or other loan where the property will be used as a security interest, for selling or transferring the property, or for other transaction).

Optionally, if a user requests that the title be unlocked, the system may verify the user's identity before granting the request. For example, the authentication process may comprise a procedure that utilizes the challenge questions discussed herein, two factor authentication, biometric recognition (e.g., facial and/or fingerprint recognition), a password, an authentication token, and/or otherwise. If the user fails authentication (e.g., fails to answer the challenge questions correctly and/or fails to provide the other requested forms of authentication), the unlocking request may be denied. If the user is successfully authenticated, the unlocking process may be performed. Optionally, after the transaction is complete (e.g., a security interest has been recorded by a mortgage lender) if the user still owns the property the user may "relock" the title by having the populated UCC form rerecorded (e.g., with any new data).

At block 340, an "account active" indication may be stored in the user account record.

In response to an instruction from the user to terminate the UCC security interest, a UCC termination document may be generated and uploaded/added to the user's profile which the user can access. In addition, the UCC termination document may be emailed or sent via a messaging service to the user, including instructions on how to use the termination document should they cancel the title security service.

In addition to property owners, other types of users (who may be referred to as commercial users) may benefit from and utilize certain features of the record security and encryption system. For example, referring partners, correspondent lenders, retail lenders, wholesale lenders, credit unions, savings & loan financial institutions, valuation companies, escrow/settlement companies, and/or real estate brokerages, may be enabled to access certain user and/or property data and/or to provide the applicable data and analytics to encourage consumer (e.g., property owner) engagements. Such data and analytics may be targeted to specific users or generally provided to users.

Examples of such data that may be provided to consumers may include current loan interest rates, available loan programs, early pay off scenarios, current home values (e.g., in a geographical area in which the consumer's property is located), homes for sale (e.g., in a geographical area in which the consumer's property is located), opportunities to move up to a more expensive and/or larger property, opportunities to move down to a less expensive property, true cost of real property ownership, rental rates for properties similar to the consumer's property, and/or other property-related opportunities. Such examples are described elsewhere herein.

Optionally, such data may be automatically provided to a commercial user in association with a notification to the commercial user in response to a user action, such as the unlocking the property title for any reason, the unlocking of the property title for certain specified reasons (e.g., a refinance, other loan, or for a sale of the property), the termination of the title security services, the subrogation of a security interest, the adding of a property to the user's property portfolio and/or other specified actions.

Certain secure referral processes will now be discussed in further detail. As noted above, a user may be referred to a website hosted by or for the record security and encryption system so that the user can create an account with, and avail themselves of the title protection and other services described herein. For example, when the user activates a link in an invitation from the referring source (which may be a registered partner/commercial user of the record security and encryption system), their web browser may be navigated to a welcome page with targeted content. For example, a token may be generated by the partner causing an invite to be presented to the user via a user interface of the partner (e.g., a dashboard). The token may be received by the record security and encryption system and may be used to fetch a "pending customer profile" from the referring source and use information in the pending customer profile to autofill a user account form, and may be used control billing options, property information, escrow information, and/or other such information discussed herein. For example, the token may be used to determine whether or not the partner will pay for the user's subscription fees for the services described herein, or cause a subscription page to be configured to support the billing options set up for the partner (e.g., discounts on the subscription price).

Optionally, rather than having to manually enter a property address to be added to a user property portfolio, the property address may be identified by the referral source/partner (e.g., via the token passed to the record security and encryption system), and may populate an address field of a property record with such address. The record security and encryption system may determine if the property has already been registered within the system for title security services, and if not, the property may be so registered (e.g., added to the user's property portfolio).

If the record security and encryption system already had the property registered in the system (e.g., in a user property portfolio) and is subject to the title security services, the record security and encryption system may generate and transmit a service termination communication to the user who currently has the property in their property portfolio and/or generate and transmit a security interest (UCC) termination form, and may unlock the property title (remove/terminate the recorded security interest on the property title) prior to relocking the property title after establishing the new user account. Optionally, the user that had previously subscribed to title security services for the property may be prompted via a communication from the record security and encryption system to instruct the system to unlock the title, and the system will unlock the title in response to receiving the instruction.

Optionally, because the referral and associated property data are coming from a trusted, secure source (e.g., a business partner of the operator of the record security and encryption system), the challenge questions (used to confirm or infer a user owns a property being registered/added to a property portfolio) are not asked, thereby reducing network and computer processing resources and enhancing process speed. Optionally, during or at the completion of the account creation process, the user may be presented with the user mailing address received from the referral source and the user may be asked to confirm the received mailing address or to provide a different or modified mailing address (e.g., in the event that the mailing address has changed from what the referral source has in its records). The new or modified mailing address may then be stored in the user profile and used for future physical mailings.

As discussed above, a user referral source may be a business partner of the record security and encryption system operator and may have an account with the record security and encryption system. For example, the partner account may be generated as follows. The prospective partner's browser may be navigated (e.g., via an activation of a link in an email or text invitation, a news article, an advertisement, or otherwise) to a welcome page specifically configured for potential referral partners. Optionally, if the prospective partner activated a signup link from an existing partner (e.g., an enterprise partner), the existing partner may generate a token. The record security and encryption system may utilize the token to fetch a "pending user profile" from the existing enterprise partner, including associated company information, office information, promotion details (which the prospective user may use to promote the services provided by the record security and encryption system to their clients), and/or the like. The prospective partner may be navigated to a subscription web page configured to display the subscription and service details (e.g., the ability to refer their customers to the record security and encryption system) for a referral partner. If the prospective referral partner registers to become a referral partner, optionally customers of the referral partner referred to the record security and encryption system may be presented with corresponding promotions (e.g., discounts, additional services, and/or the like) in response to determining that such referral occurred.

Optionally, to further enhance security and services, if the customer subscribes to the title security services (including the title locking feature), the referring partner may be notified (optionally in real time) upon detecting that the customer performed certain actions and/or in response to detecting certain modifications of customer-related data (e.g., changes or attempted changes to the customer mailing address) and/or customer property-related data (such as the recording of a new security interest with respect to a property title, or other data, such as described elsewhere herein). For example, the record security and encryption system may generate and transmit, optionally in real time, a communication to the referring partner system in response to detecting that a customer referred by the referring partner has requested that a property title be unlocked. The referring partner may then execute its own security and verification processes.

Optionally, even if the customer does not subscribe to the services offered by the record security and encryption system, the record security and encryption system may still generate and transmit to the partner system notifications regarding detected public activities related to the customer's property title (e.g., changes of mail address, recording or release of security interests, subordination of security interests, and/or the like).

Optionally, a service provider (e.g., a title insurance company, an escrow/settlement service provider, an attorney, etc.) may create an account. The service provider's browser may be navigated (e.g., via an activation of a link in an email or text invitation, a news article, an advertisement, or otherwise) to a welcome page specifically configured for service providers. For example, the service provider may activate a signup link from an enterprise partner, in which case, a token may be used to fetch a "pending user profile" (e.g., comprising a physical address, email address, company name, phone number, and/or other data of the service provider) from the enterprise partner and may be used to prepopulate various account creation user interface fields.

The service provider may also be enabled to select a service provider-type from a menu of service provider-type (e.g., title insurance company, escrow/settlement service provider, attorney, or other). Optionally, the service provider does not need to have a paid subscription to any service offered via the record security and encryption system, but may nonetheless utilize the system to determine if a given property is still subject to the title security services provided via the system. Optionally, the service provider may be enabled to request, via a user interface, a service and/or security interest termination instruction with respect to the property and/or a subordination of the "lock" security interest to another security interest. Optionally, the service provider may be enabled to request, via a user interface, a copy of a UCC filing document and/or service agreement.

The service provider (and/or other users described herein) may be enabled to utilize a search engine to search for property and/or user related data. For example, a search user interface may provide filters (e.g., a menu or text field) via which the service provider may specify one of more of the desired matching terms for a property address and/or mailing address: property state, property county, property parcel number, order number or a portion thereof, property address (number, street name, unit number, city, and/or zip code), owner first name, owner last name, trust name, owner mailing address (number, street name, unit number, city, and/or zip code), etc.

Figure 4:
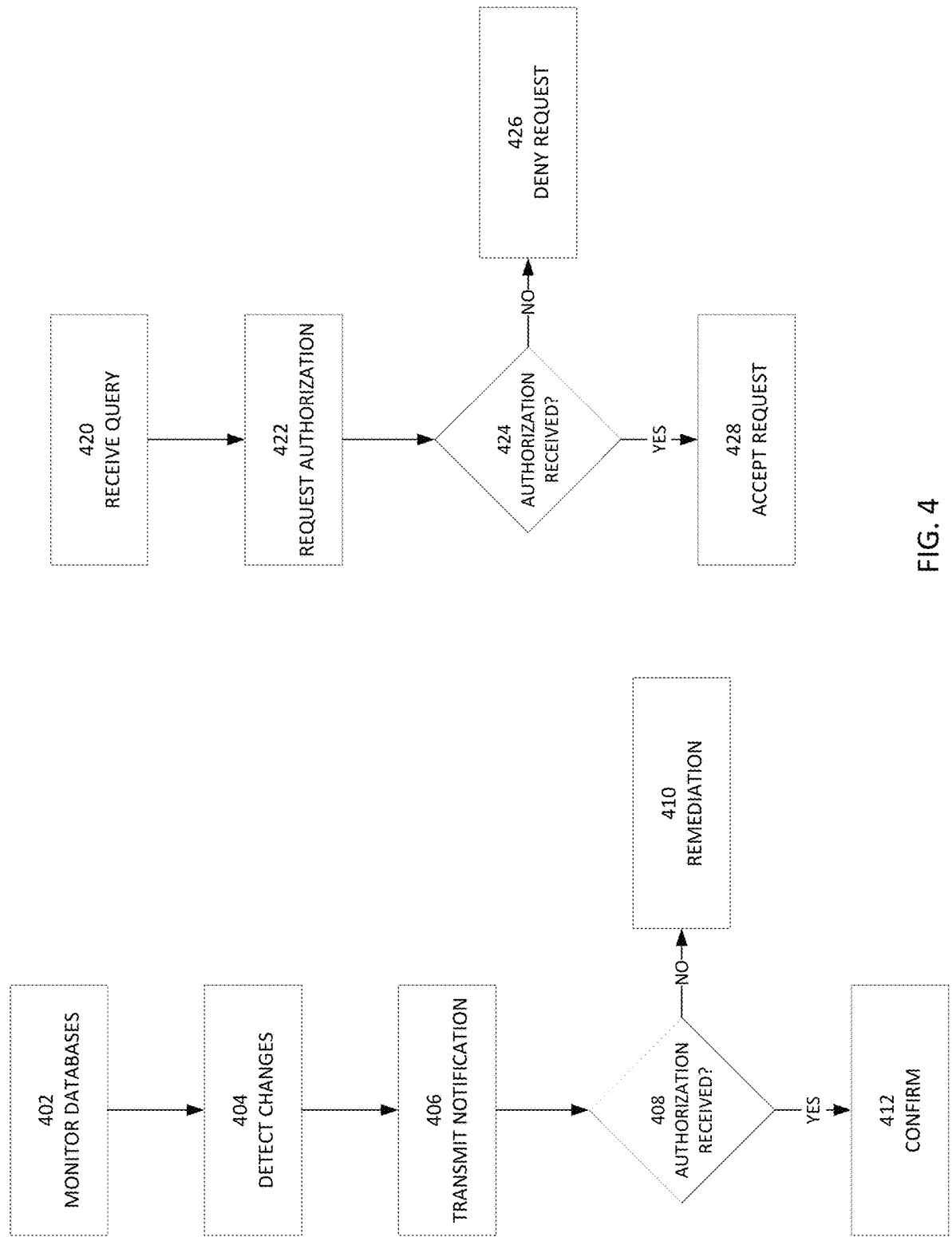

Referring now to FIG. 4, certain security protocol processes are described that provide added title record security. At block 402, one or more public databases (e.g., county record and/or secretary of state databases) and/or one or more private databases (e.g., that record information regarding real property, including valuations, mortgages, property address, owner name, parcel identification number, zip code or other area, frequency of property sales, and/or other information) may be monitored.

At block 404, a determination is made as to whether certain changes on a change warning list have been requested or made. For example, searches may be performed (e.g., periodically, such as hourly, daily, weekly, monthly, yearly) via the databases for a given item of real property that is subject to a title lock (e.g., a security interest filed on the property to prevent unauthorized actions being performed with respect to the title) to determine if a change has been requested or made to a mailing address on a tax roll, if a request has been made for a mortgage (where the user/owner has not made a request to unlock the title), if an attempt has been made to record a property ownership transfer, and/or the like. By way of context, a very large percentage of financial elder abuse is attempted, and conducted, by other family members or fiduciaries; and the most common initiation of abuse is the alteration, or attempt to change, contact information. Thus, the detection of such changes in contact information, such as an address, and notifications to appropriate recipients thereof, provides a significant defense against financial elder abuse and fraud.

At block 406, a communication (e.g., a telephone call, an email, a messaging communication, and/or the like) may be provided to the user/owner of the property that describes the detected change. Optionally, in addition or instead, the notification may be provided to one or more other recipients (e.g., a family member, partners, and/or service providers that assist in protecting users against fraud).

At block 408, a determination is made as to whether the user responded with a communication confirming or refusing the changes. If the user refuses the changes, at block 410, one or more remediation acts may be taken (e.g., the changes may be denied or reversed). For example, an authorized change in address may be reversed to the correct address (e.g., via the record security and encryption system or by the user/owner).

If the user confirms the changes, at block 412, a confirmation communication may be transmitted to the user (e.g., indicating what changes were made and confirmed, etc.) and corresponding indicators may be stored in memory.

In addition to detecting changes or change requests relating to a title, a security protocol may be followed for requests related to the security interest (e.g., a UCC filing) with respect to the real property. For example, at block 420, communications (e.g., requests) from certain sources regarding the property may be monitored to determine if someone is attempting to perform an improper transaction with respect to the property. By way of content, a mortgage would typically require title insurance, and the lender would want the security interest (e.g., a UCC filing) previously recorded by the record security and encryption system, as lock on the title, to be removed/terminated or subordinated to the lender's mortgage. Thus, in such a scenario, the title insurance company or other entity may provide a communication (e.g., a telephone call, an email, a messaging communication, and/or the like) to the operator of the record security and encryption system requesting that the operator subordinate its security interest filing to the new loan.

At block 422, a request for confirmation and authorization to fulfill the request may be transmitted (e.g., a telephone call, an email, a messaging communication, and/or the like) to the user/owner of the property. Optionally, certain service providers of the user may likewise be notified of the request.

At block 424, a determination may be made as to whether the user/owner provided authorization to the record security and encryption system or system operator to fulfill the request.

At block 426, in response to a user communication denying the request (or in response to a failure of the user to respond within a threshold period of time, such as 1 hour, 24 hours, 48 hours, or other specified time period), a communication may be transmitted to the requester denying the request and/or an indication of the request denial may be stored in the user record. For example, if the record security and encryption system or system operator denies the request to subordinate the security interest title lock to a new mortgage, it is unlikely that the new mortgage will be granted, hence preventing an authorized mortgage-related security interest from being recorded against the property, thereby protecting the property title.

If the user approves the request, at block 428, a confirmation communication may be transmitted to the user and optionally one or more service providers, indicating what requests were confirmed by the user and were complied with, and corresponding indicators may be stored in memory. In addition, the requests (e.g., to remove/terminate or subordinate a security interest to a new mortgage or other loan) may be complied with and executed.

Figure 5:
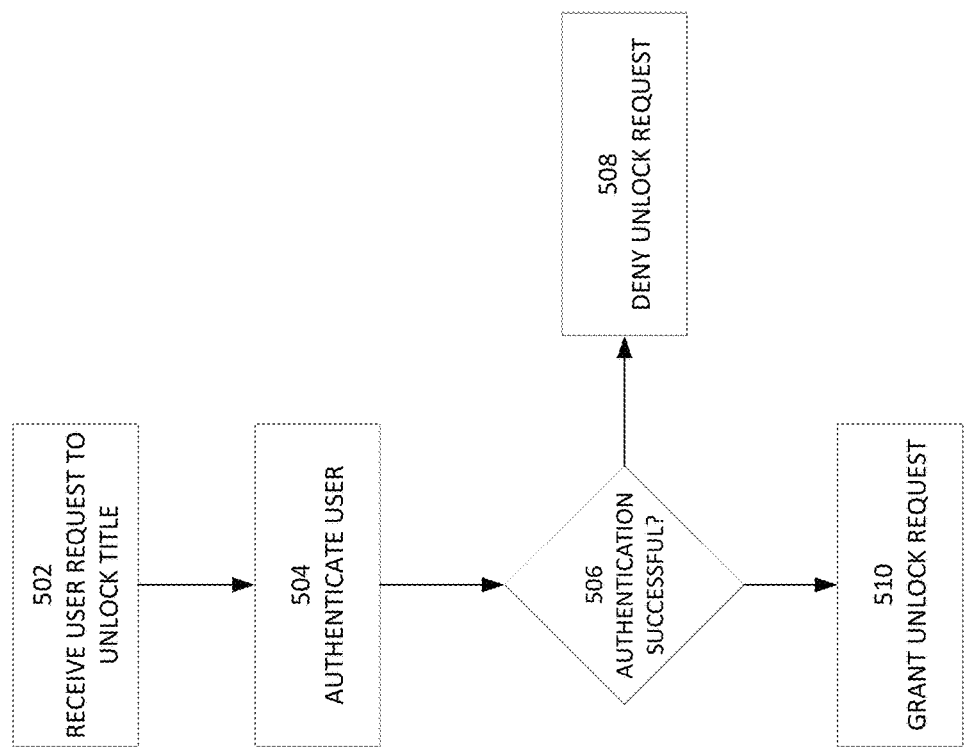

Referring now to FIG. 5, an example security protocol process is illustrated for unlocking a title. In this example, the title has been secured by the filing of a security lien on the title (e.g., a UCC filing with the appropriate county records database and/or the secretary of state database for the state in which the property is located) by the record security and encryption system or system operator. Such a filing is configured to prevent a third party attempting to commit fraud by recording a new deed (e.g., a quitclaim deed) with a forged signature of the actual owner that purports to transfer ownership of an identified item of real property from a user to another entity (e.g., another person or business entity).

At block 502, a request to unlock the title on an identified item of real property association with a user's property portfolio is received from someone that is purporting to be the user/owner of the real property. For example, the unlock request may be made via a user interface accessed via a webpage (e.g., of the record security and encryption system) or via a dedicated application, such as the record control application discussed herein. The unlock request may include a reason for the unlock request (e.g., selected from a menu presented via the user interface), such as a new loan is being obtained.

At block 504, the person purporting to be the user is authenticated to determine if the person actually is the user (e.g., the owner of the real property). For example, the user may be authenticated using facial recognition, where the face of the user, received via a front facing camera of a computer device (e.g., a mobile smart phone, laptop, or other computer device), is compared against that recorded for the actual user during the account creation process or other enrollment process to determine if they are of the same person. In addition or instead, a person purporting to be the user may be authenticated using a token, such as an encrypted token/code bound to a core data object (that may only be known to the actual owner) as described elsewhere herein.

At block 506, a determination is made as to whether the authentication was successful (e.g., the biometric and/or encrypted token matched those of the actual user), wherein the authentication is successful where the person making the unlocking request was determined to be the user (the holder of the account with the record security and encryption system whose property portfolio includes the item of real property).

If the authentication is unsuccessful, at block 508, the unlocking request is denied. A message may be generated and communicated to the actual user (e.g., to an electronic address included in the user's record, such as an email or messaging address) notifying the user of the attempted unlocking request, and the denial thereof. Optionally, a corresponding notification may be provided to one or more authorized service providers and/or referring partners to enable them to take additional actions to further enhance title security. A denial notification is optionally also presented via the webpage or application interface used to submit the unlocking request.

If the user authentication is successful, at block 510, the unlocking request is approved, and the lien is removed (e.g., terminated) from the property title record (of the county recorder database and/or the secretary of state database). A message may be generated and communicated to the actual user (e.g., to an electronic address included in the user's record, such as an email or messaging address) notifying the user of the execution of the unlocking request. Optionally, a corresponding notification may be provided to one or more authorized service providers and/or referring partners. Optionally, the title may be automatically or manually relocked (e.g., the removed/terminated lien or another lien may be recorded against the property title) in response to a certain amount of elapsed time (e.g., 24 hours, 36 hours, 48 hours, 7 days, or other time period) or in response to determining that a certain event has occurred. For example, the event may be a request from the user to relock the title or a determination that an event identified by the user (e.g., a new mortgage) as the reason for unlocking the title has occurred (e.g., a security interest has been recorded against the title by the mortgage lender).

Other features providing enhanced security and services will now be described.

Optionally, title insurance companies may act as decentralized "peer to peer" identity verification components.

Optionally, valuation companies (e.g., real estate property appraisal management companies) may provide periodic (e.g., monthly or annually) valuations of properties in a user's property portfolio, analyze new GSE (Fannie Mae and Freddie Ma) lending requirements and generate compliant property data reports (PDR) which optionally include functional floor plans and building sketches and/or other data. Such data may be accessible to the user via the consumer dashboard described herein.

Optionally, escrow/settlement companies may use the disclosed system to search the database(s) for a given property, upload recorded security interest documents (e.g., a UCC security interest document), and/or to request termination forms.

Certain example dashboards will now be described. The dashboards may include a dashboard utilized by operators/administrators of the record security and encryption system, a dashboard that may be utilized by a partner (e.g., a commercial entity that provides services to users or prospective users of the record security and encryption system), and a dashboard that may be utilized by consumers (e.g., property owners that utilize the title security services described herein).

Optionally, the record security and encryption system provides customer relationship management (CRM) functions that enables the system operator to perform administrative operations. For example, the system enables an operator to set up accounts and/or permissions for commercial users, users of the company that operates the system, and/or direct consumer business users. In addition, the system enables an operator to specify global administrative settings, such as payment gateways, public facing website content, failed payment resolutions, payment information updating, property level audits. The system further enables the management of commercial user promotions and/or the specification of user profiles for customer service (e.g., user information, assigned partners, notes, billing information, ability to validate private tokens (e.g., encrypted tokens), title resolutions, and/or the like). The system may also enable access to county-by-county recorder databases, provide application programming interfaces (API) for recording UCC or other security interest documents, enable communication with consumer and commercial users via text, email or otherwise. Some or all of the foregoing functionality may be accessed via a dashboard by an operator that has the appropriate authorization.

Similarly, a dashboard may be provided for commercial users (e.g., business partners of the company that operations the system) that provides CRM functionality. Such CRM functionality may enable a commercial user to manage their employees, customers (e.g., customers' asset information, activities and/or export reports). Further, the commercial user dashboard may enable the commercial user to add and edit users, and role types. In addition, the CRM functionality may enable the commercial user to invite customers (e.g., property owners) to the application (e.g., by an email, text or bulk invitation that includes a link to the website webpage wherein the user may create an account as discussed herein). The link (which may be referred to as a referral link) included in the invitation may be unique to the commercial user (e.g., where the identification of the referring may be passed in the HTTP_REFERER header) and may enable the record security and encryption system to identify the referral source. An identification of the referral source may be stored in the user and/or the commercial user records. The referring commercial user may optionally be authenticated and/or verified as being who it purports to be prior enabling the commercial user to be a referral source to further enhance data security.

The referring commercial user may be provided with benefits as a result of the referral (e.g., the ability to promote services to the referred user and/or other users of the record security and encryption system, a commission if the user subscribes to services described herein, and/or the like). Optionally, a commercial user is enabled to query and view clients' activities with respect to the record security and encryption system. Optionally, the commercial dashboard enables notification profiles to be defined for specific events (e.g., events described herein) or for pre-set queries. Thus, the disclosed dashboard and services enable commercial users to provide access to data that may be used for customer engagement.

Similarly, a dashboard may be provided for consumer users. The consumer dashboard optionally provides access to data, analytic tools, and/or consumer provided material into an easy use and navigate user interface, whereby the user does not have to navigate through webpage after webpage to access desired tools and/or data. Information (e.g., names, services, links, contact information) may be provided regarding one or more partners whose services may be of interest to the consumer. Optionally, the partner data may be formatted as a V-Card format which is likely to be familiar to consumers and via which it is quick and easy to locate certain partner data. The consumer dashboard may also provide access to and display to the consumer their property profile, the entire chain of title for properties in their property profile (or the chain of titles for a previous number of specified years), daily notifications (e.g., regarding locking and unlocking of property titles, any requests for changes for a property title record, partner offers, property valuation data, and/or other such data disclosed herein), and/or review an annual audit (e.g., to update data as needed). The consumer dashboard may also enable the user to "unlock" a title for a given property in their property profile, and permit a new loan, re-sale of the property, or the like to be recorded or otherwise modify the property title record.

By way of other example, the consumer dashboard may enable the user to access real time property values over a specified number of years (e.g., the last 5 or 10 years), a certified property value and/or BPO (broker price opinion), current rental rates (e.g., for a property's neighborhood, such as a zip code), new loan comparisons, loan options (e.g., available from lender partners), a user property loan compared to other potential loan types (e.g., a 15 year fixed loan, a 5/1 ARM loan, cash out options), the effect of making extra loan payments on the total interest that will be paid and/or how long it will take to pay off the loan, and/or other information.

The record security and encryption system may also calculate or access and provide to the consumer move opportunities. For example, the record security and encryption system may calculate, assuming the consumer sold their house at a current valuation, where and what homes the consumer could purchase (e.g., with an increase or decrease in the residence's building and/or property square footage with their equity in their existing home (and optionally keep the same payments)). Such data may enable a consumer to determine whether they should stay in their current residence or move to a smaller or larger home in a less expensive or more expensive area.

By way of further example, the record security and encryption system may access and provide 1031 property exchange opportunities (a swap of one real estate investment property for another real estate investment property that enables capital gains taxes to be deferred). By way of illustration, the record security and encryption system may calculate or access and provide the return on investments for various potential investment properties compared to neighboring opportunities.

Optionally, the consumer dashboard may provide access to a net sheet calculator configured to provide an estimate of closing costs and net proceeds from the sale of their property.

Optionally, the consumer dashboard may provide the consumer with access to a document vault (e.g., for documents related to one or more consumer properties registered in the consumer's property profile). For example, the documents may include annual certifications (e.g., for the property title, valuation, tax bills, previous sale disclosures), recorded grant deed, recorded deeds of trust and reconveyances (when applicable), recorded UCC filings (and archives thereof), security interest (UCC) termination notices (and archives thereof), subordination agreements (and archives thereof), the record security and encryption system service agreement, a property floor plan (e.g., in vector and/or digital form), and/or the like.

The dashboard may also provide access to certain security logs maintained by the record security and encryption system (e.g., logged access and/or modifications to objects, the user profile, the user's property profile, and/or the like).

As discussed elsewhere herein, the record security and encryption system may be connected to and may access one or more databases (e.g., public and/or private databases), and may also receive and store user and property data from a user (e.g., a consumer). Thus, the record security and encryption system may access and store some or all supporting documents pertaining to an insurable asset (e.g., real estate property). A given user property portfolio may include a private, secure repository of some or all documents pertaining to a given real property asset. Thus, the repository may function as a user-focused verification of asset data from insurance, mortgage, and/or tax documents, and from valuation histories. Such functionality enables and encourages consistent user engagement.

Certain example consumer user interfaces (including those intended for a property owner seeking to protect their title from fraudulent actions) will now be described with reference to the figures. The user interfaces may be presented on a user device via a dedicated application (e.g., such as described herein, where the application may be downloaded to a user device from an application store) or via a browser on the user device (e.g., where the user device accesses the user interfaces from a web browser hosted or operated in association with the record security and encryption system). In addition, the user interfaces may be populated in whole or in part by the record security and encryption system and/or other data sources described herein.

Figure 6A:
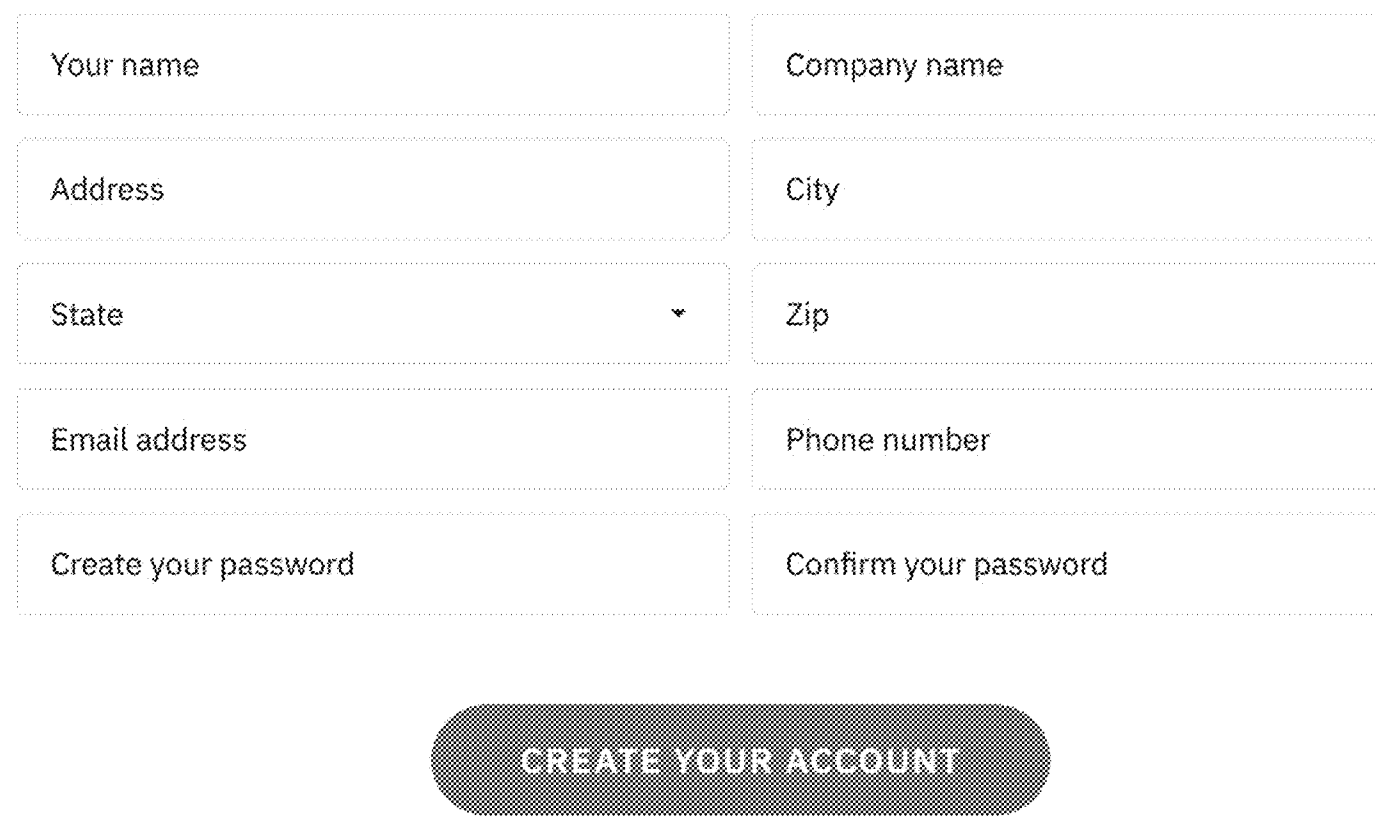

FIG. 6A illustrates an example account creation user interface with fields configured to receive various user data from a user (e.g., name, company name, address, email address, mobile phone number, new password).

Figure 6B:
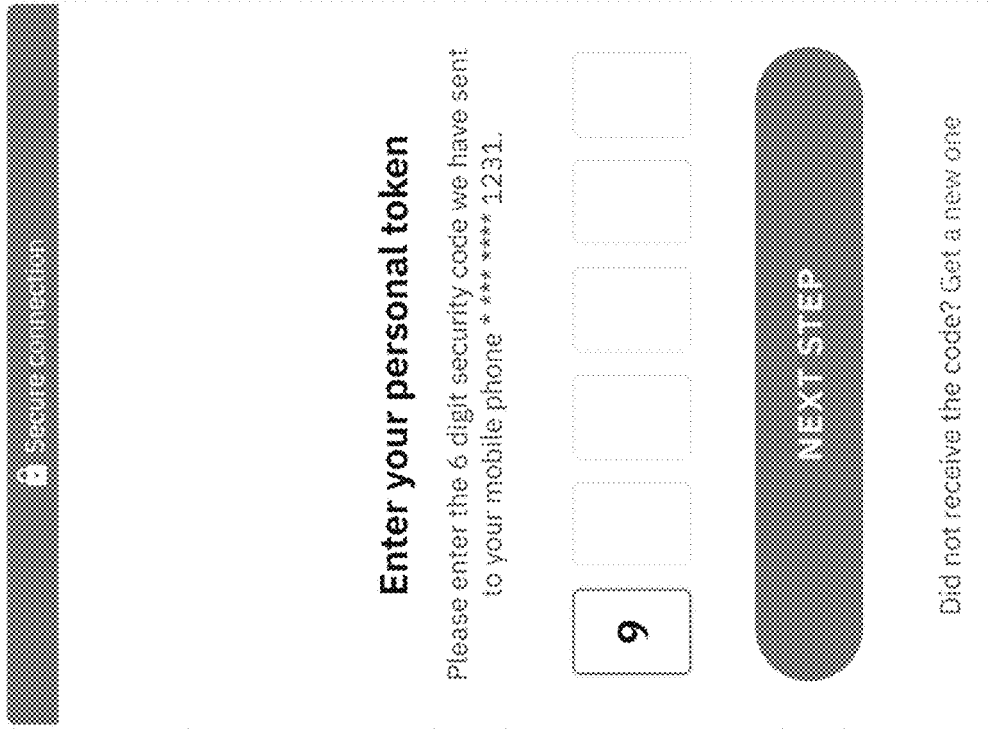
FIGS. 6A-7J illustrate example user interfaces.

As similarly discussed elsewhere herein, a token (e.g., a multi-digit encrypted code) may be generated and transmitted to an electronic address (e.g., an email address or phone number) provided by the user via the user interface illustrated in FIG. 6A. Referring now to FIG. 6B, an example user interface is illustrated configured to receive the code from the user after the code has been transmitted to an electronic address provided by the user, in order to verify that the user actually has access/control of the electronic address. A control is provided via which the user can request that a new token be generated and transmitted to the electronic address (e.g., if the user did not receive the initial token).

Figure 6C:
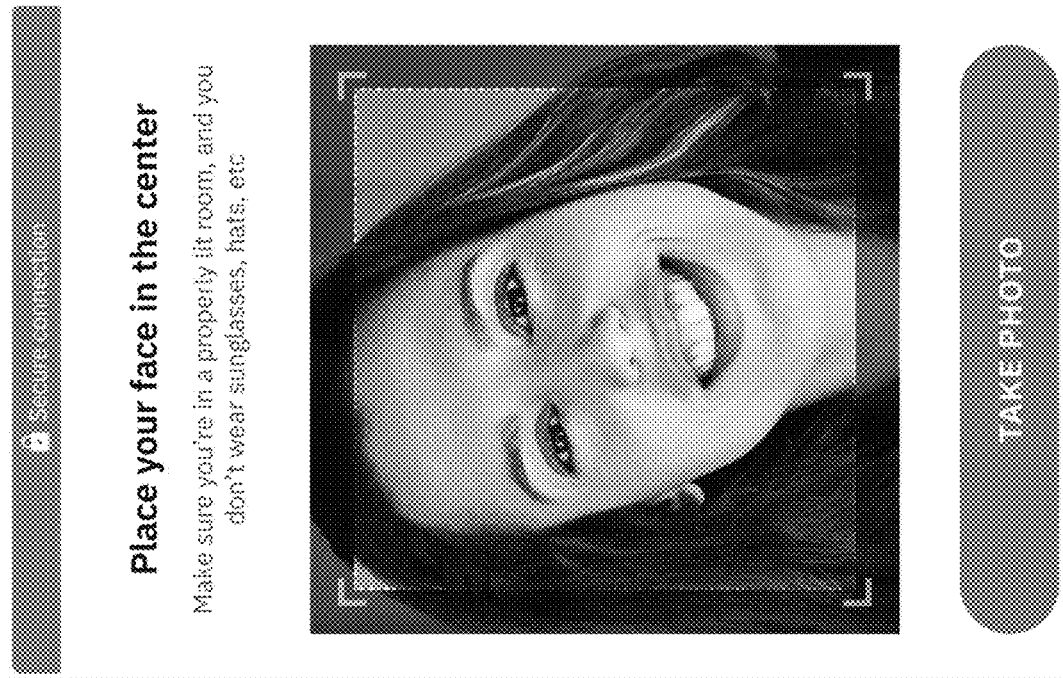

FIG. 6C illustrates an example user interface configured to prompt the user to provide biometric data (e.g., a photograph of the user's face, properly centered and lit) to be used for future authentication of the user as described herein.

Figure 6D:
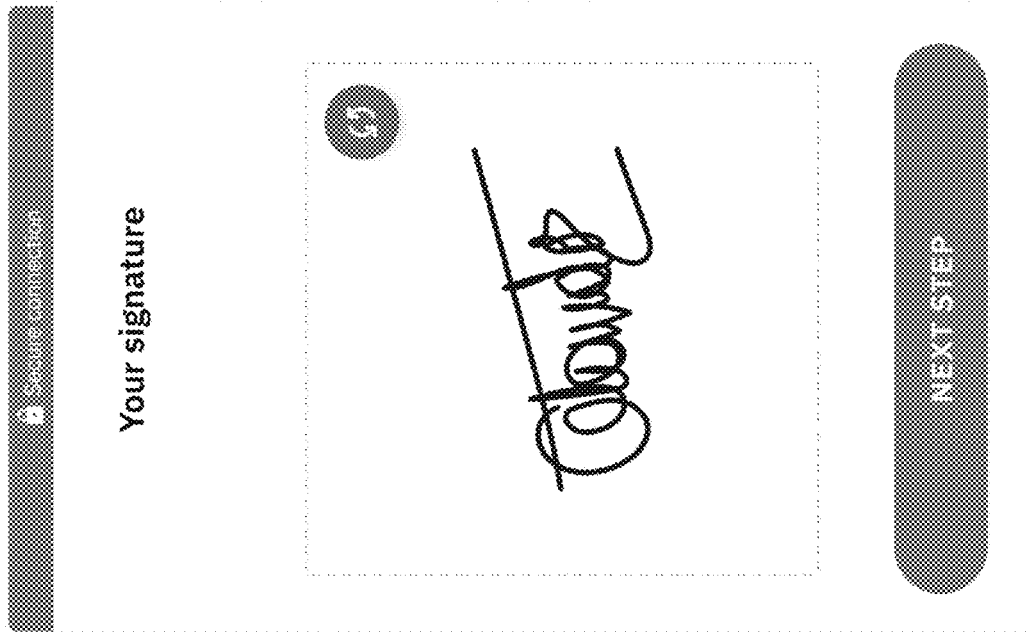

FIG. 6D illustrates an example user interface configured to receive an electronic signature from the user (e.g., by a user tracing the user's signature using a mouse, a finger or a touch screen or touch pad, or otherwise). The signature may be utilized as a binding signature to terms of service associated with the services provided via the record security and encryption system.

FIG. 6E illustrates an example user interface configured to present challenge questions to a user (e.g., in order to verify that the user likely actually owns the property the user is adding to a property portfolio), with corresponding fields configured to receive the user's response. An address of the property may be presented, which the user may be requested to verify that it is the correct, accurate address.

FIG. 6F illustrates an example user interface configured to notify the user that the account was successfully created, and that a confirmation communication has been transmitted to an electronic address provided by the user during the account creation process (e.g., an email address).

Figure 6G:
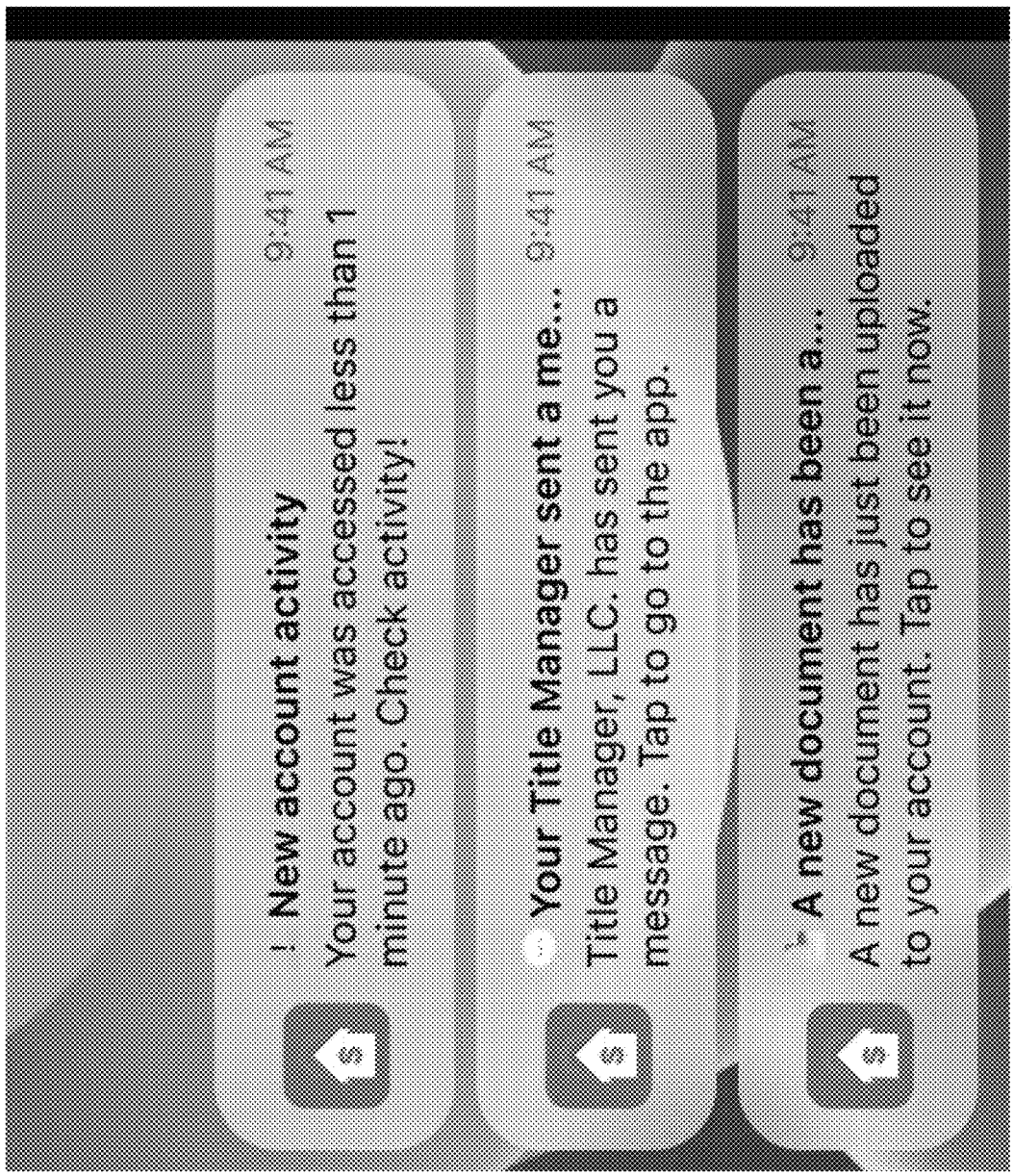

FIG. 6G illustrates example notifications transmitted to a user (e.g., to a user mobile phone address) by the record security and encryption system, such as in response to detecting new account activity, or when a title manager has sent a message to the user that is accessible via an application, such as the record control application described herein, or when a new document has been uploaded to the user's account or title record. Optionally, the notifications may comprise respective links which when activated (e.g., tapped or clicked on), cause additional information to be accessed from the record security and encryption system (and/or other source) and presented to the user (via the record control application or a browser), such as information on what new account activity has been detected, the actual complete message for the user, an image of the uploaded document, and/or the like.

FIG. 6H illustrates an example user interface via which the user may remove an item of real property from the user's property portfolio (e.g., because the user no longer owns the real property). Once the property is removed from the user's property portfolio the user may no longer be permitted to lock or unlock the property title, unless the property is added again to the user's property portfolio (e.g., after verifying that the user owns the property). The user interface further enables the user to cancel the title security services described herein.

Certain example commercial user interfaces (e.g., for a service provider, such as a broker) will now be described. It is understood that certain of such user interfaces may also be provided to consumer users.

Figure 7A:
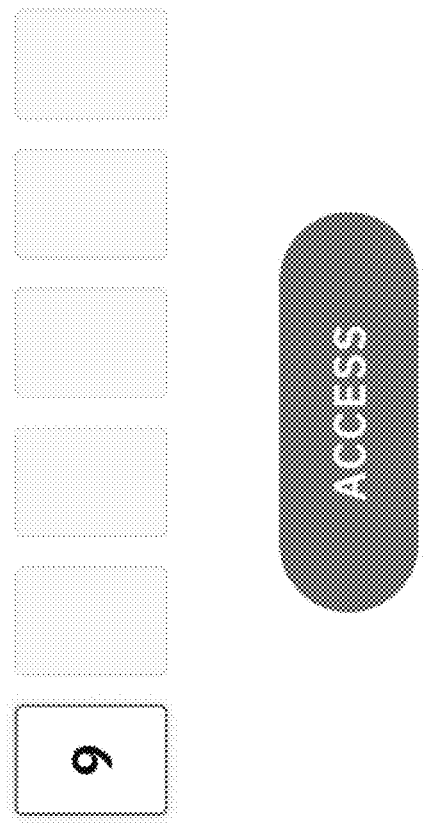

FIG. 7A illustrates a token receiving user interface, wherein the user needs to enter into a token (e.g., a multi-digit code) in order to access certain data (e.g., documents uploaded by the user) of the user.

FIG. 7B illustrates an example user interface (e.g., configured to be displayed on relatively larger display, such as a laptop, desktop, or the like) displaying a table of properties that the user is providing related services for (e.g., brokerage services) or that are in select users' property portfolios. The user interface may display the property address, property type (e.g., RSFR (Residential Single Family Residence), RSFA (Single Family Attached (e.g., condo, townhouse), RSFD (Single Family Detached), etc.), year built, year last sold, current owner, and/or number of associated documents (whether already uploaded or pending upload, where the status may indicated by the table). Filter controls may be provided via which the user may instruct that the table contents be accordingly filtered and displayed. For example, the user may filter the table based on the contents of one or more columns (e.g., address range, city, state, zip code, property type, year built, year last sold, name of current owner, and/or based on other property-related data described herein). In addition, a free form search field may be provided via which the user may enter one or more search terms, and the record security and encryption system may utilize a search engine to search for matching properties, identify and rank matches, and cause the identified matches (e.g., in ranked order) to be displayed via the user device.

Figure 7C:
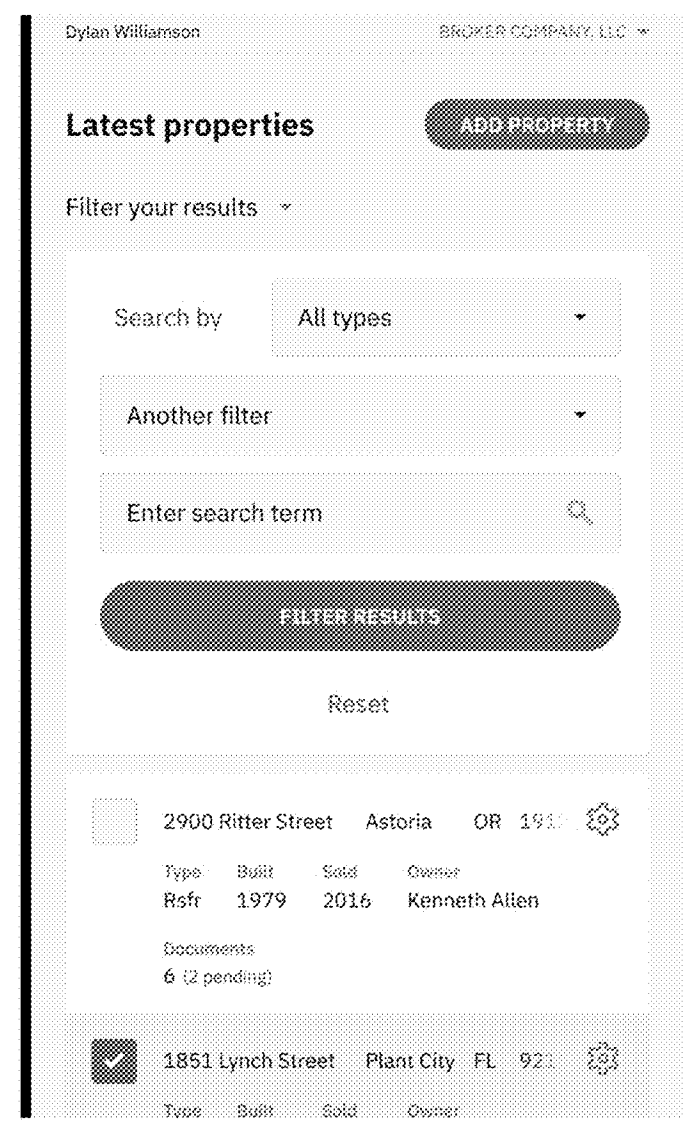

FIG. 7C illustrates an example user interface similar to that of FIG. 7B, but configured to be displayed by a relatively smaller display (e.g., a smart phone display). The user may select one or more properties, for which more property details will be accessed and displayed.

Figure 7D:
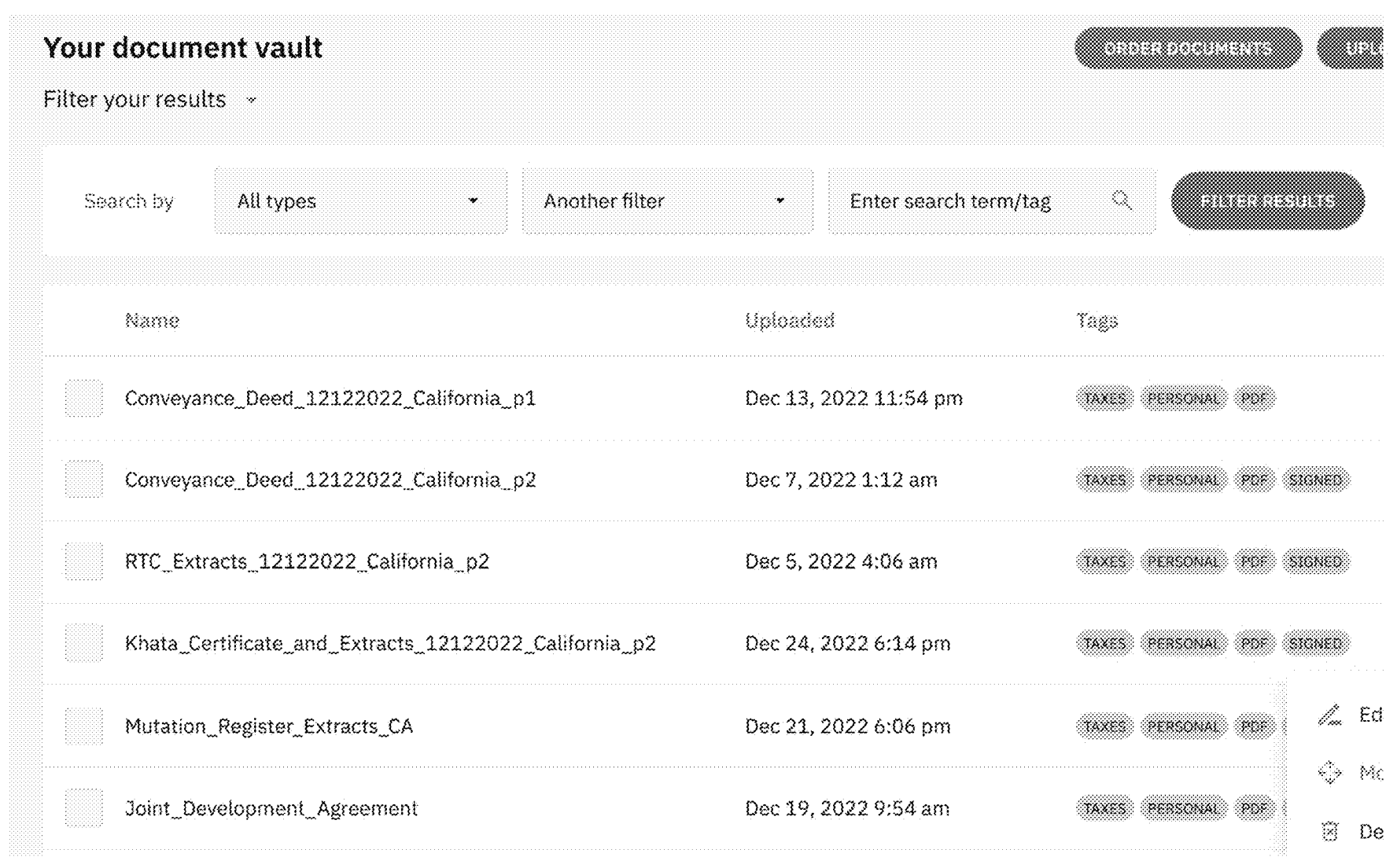

In response to a user selecting the documents entry in the documents column of FIG. 7B (or similarly FIG. 7C), the example user interface illustrated in FIG. 7D may be presented. The user interface comprises a table listing the associated document names, the date and time the documents were uploaded, and tags that have been assigned to the documents (e.g., by a user that uploaded the documents or added at a later time). The tags may have been selected from a menu of tags and or entered via a free form text field (see., e.g., FIG. 7F). Examples of tags may include an indication as to the subject matter of the document (e.g., taxes, deed, UCC filing, etc.), an indication as to whether the document is a personal or public document, an indication as to the document format (e.g., Word doc, PDF, text file, etc.), an indication as to whether the document is executed (signed) or unexecuted (unsigned), and/or the like.

Filter controls may be provided via which the user may instruct that the document table contents be accordingly filtered and displayed. For example, the user may filter the table based on the contents of one or more columns (e.g., document name, document type, date uploaded, time uploaded, tags). In addition, a free form search field may be provided via which the user may enter one or more search terms, and the record security and encryption system may utilize a search engine to search for matching documents, identify and rank matches, and cause the identified matches (e.g., in ranked order) to be displayed via the user device.

Figure 7E:
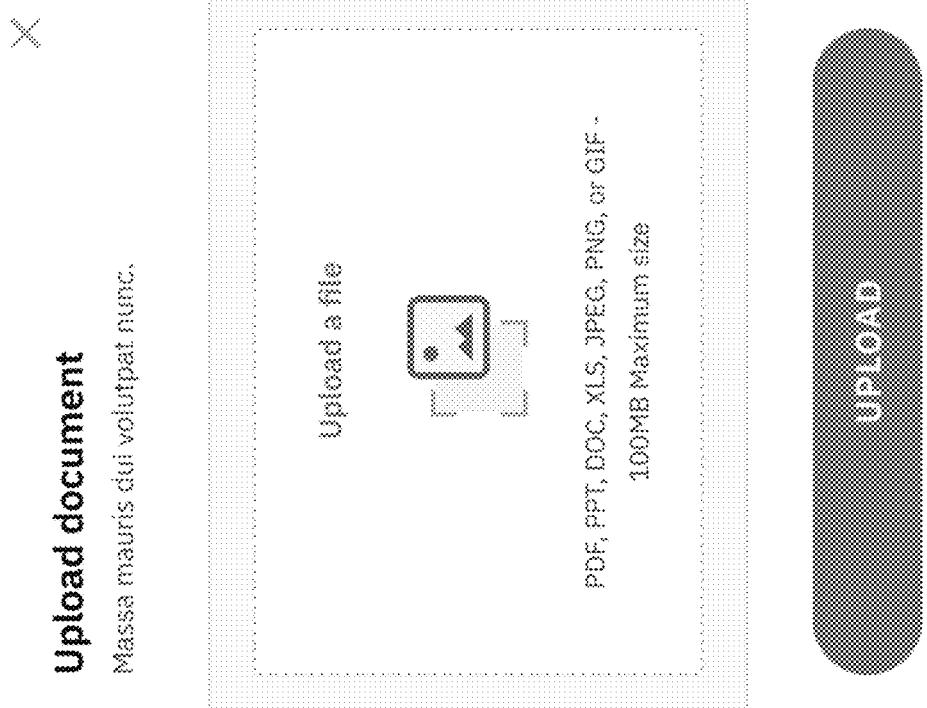

FIG. 7E illustrates an example user interface via which the user may upload documents to the user's online document vault. For example, a user may drag and drop a document to a drop area and the document will then be uploaded using a secure communication protocol to an online storage system, as described elsewhere herein. Optionally, the maximum size of a document that may be uploaded may be limited to a specified size (e.g., a specified number of bytes) to reduce network and memory utilization.

Figure 7F:
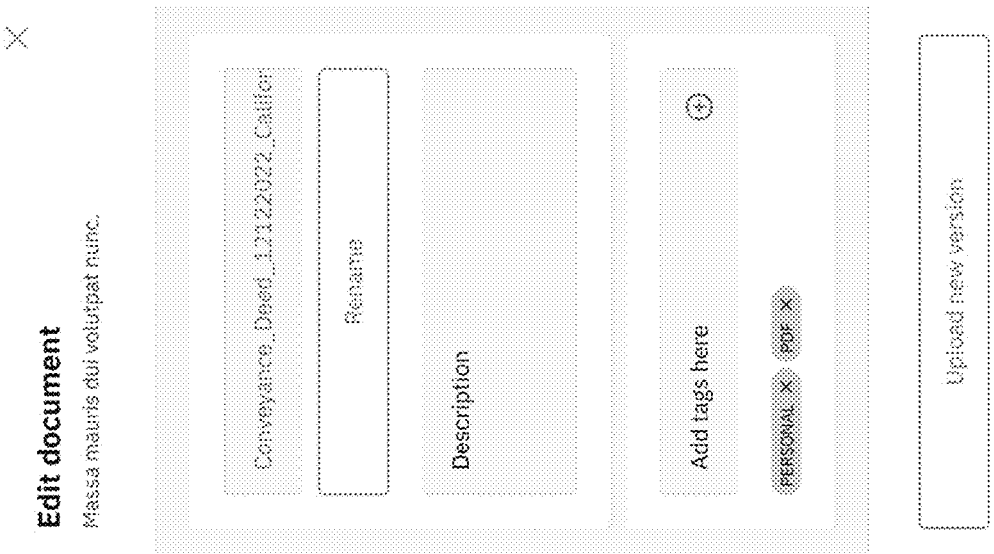

FIG. 7F illustrates an example user interface which enables a user to edit a document and/or document properties. For example, a fields and controls may be provided via which a user may edit a document name, add or edit a document description, and add, edit, or remove tags.

Figure 7G:
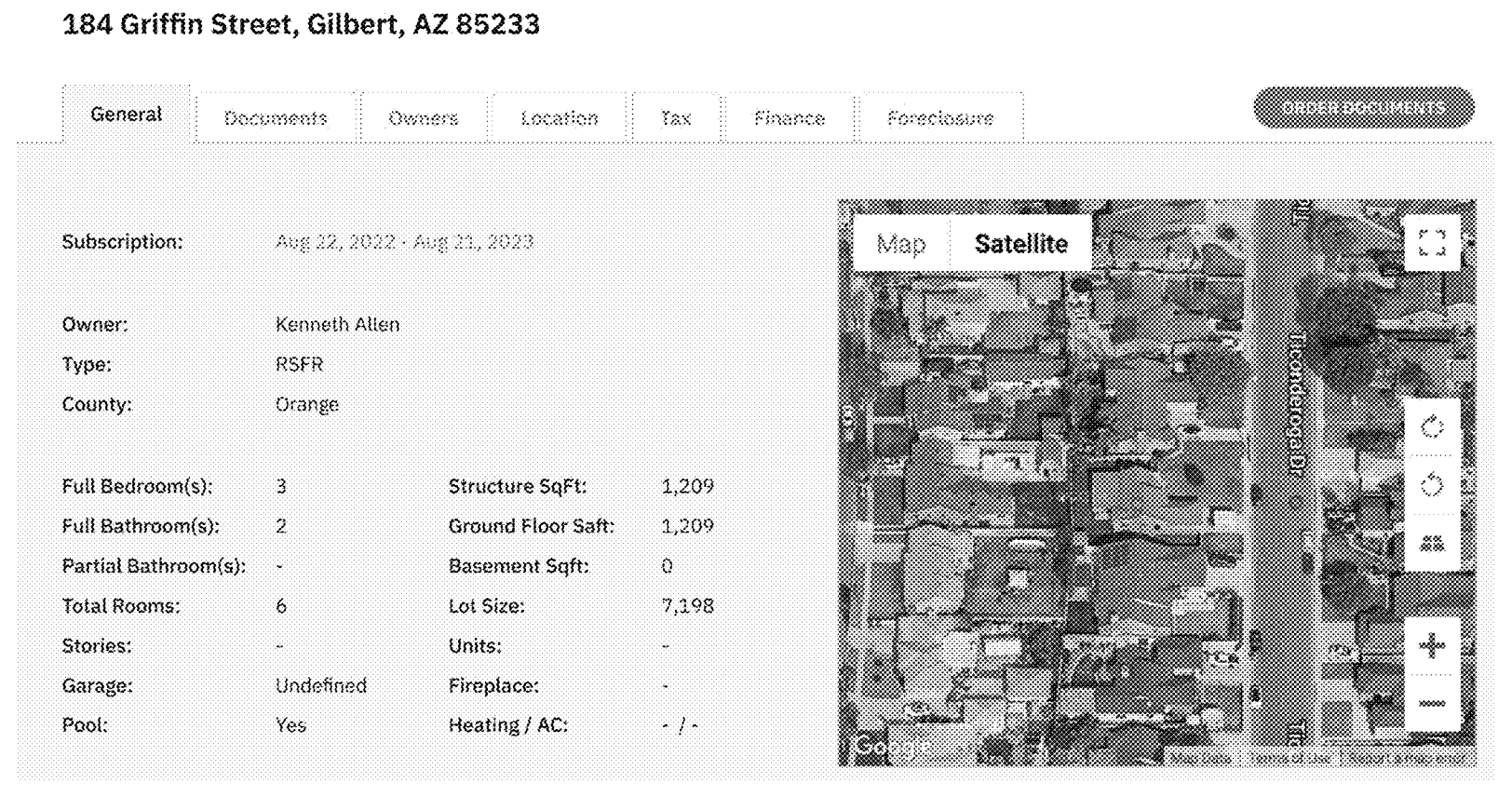

FIG. 7G illustrates an example property user interface. Tabs may be provided providing quick access to different categories of property data, while greatly reducing the number of interfaces that need to be navigated through in order to access desired data. Such tabs may include general property data, property-related documents, a history of property owners, property location, property tax data, property finance data, and property foreclosure data, by way of example. The data used to populate the various user interfaces may be accessed over a network from the security and encryption system and/or other sources.

In FIG. 7G, the general tab is selected and generate property data is accessed from a data store and displayed. The general property data may include the start date of a subscription that provides the title security services described herein, and a future expiration date. In addition, the property owner name, the property type, the property county, the number of bedrooms, the number of full bathrooms, the number of partial bathrooms, the total number of rooms, the number of stories, whether there is a garage, whether there is a pool, the structure square footage, the ground floor square footage, the basement square footage, the lot size square footage, the number of units, whether there is a fireplace, whether there is heating, whether there is air condition may be provided or indicated. In addition, one or more images of the property and surrounding area may be provided, optionally with associated street names (e.g., a satellite or aerial photograph of the property and surrounding area).

Referring now to FIG. 7H, the documents tab of FIG. 7G is selected. The example user interface provides the recording date/time of the documents (e.g., deeds) for the property (e.g., the date recorded in the county recorder database and/or the secretary of state database), the property sale price associated with the document (e.g., the deed transfer), the deed type (e.g., general warranty deed, special warranty deed, bargain and sale deed, quitclaim deed, grant deed, etc.), document number, and/or the buyer and seller associated with the document (e.g., the deed).

Referring now to FIG. 7I, the tax tab of FIG. 7G is selected. The example user interface provides the tax data for the property, such as the Assessor Parcel Number (APN), legal description (e.g., tract identifier, lot identifier), taxable area, assessed value, and percent improved.

Advantageously, a user may be able to selectively download or otherwise receive certain user data. For example, with reference to FIG. 7J, the user may be able to select amongst the following data types: the user's stored data (e.g., images, documents, and other files); the user's property list, address book, and company information, account overview (e.g., saved data and templates); and/or other data. The user may be able to specify whether the data is to be displayed and/or downloaded as an HTML formatted file, a portable document format (PDF) file, a Word document file, a text file, and/or the like. In addition, the user may be able to specify an electronic address (e.g., selected from those in the user's profile) to which the selected data is to be transmitted.

Thus, various aspects for enhancing data security are described. Such aspects include biometric verification, secure tokens comprising encrypted and/or hashed data, multifactor authentication, the use of secure network protocols comprising encryption, and/or other techniques described herein.

Certain aspects will now be described, where any of the aspects may be used singly or in combination with other aspects.

An aspect of the present disclosure relates to an encryption and data security system, comprising: a network interface; at least one processing device operable to: receive, via the network interface, a protection request for a first asset from a first user; access a plurality of data items associated with the first asset; generate a secure token comprising an encryption and/or hash of at least a portion of the plurality of data items associated with the first asset; record on a distributed, synchronized database, the secure token comprising the encryption and/or hash of at least a portion of the plurality of data items associated with the first asset; generate security content for the first asset; cause the security content to be recorded in a third party database in association with a first document evidencing ownership of the first asset, to thereby inhibit an unauthorized recording of a second document evidencing ownership of the first asset; receive a request from a first person purporting to be the first user, the request comprising a request to remove the security content; utilize biometric authentication and at least one other form of authentication to determine whether the first person is the first user; at least partly in response to a determination, based at least in part on the biometric authentication and the at least one other form of authentication, that the first person is the first user, cause the security content recorded in the third party database to be functionally removed and transmit a notification regarding the functional removal of the security content to one or more electronic destinations; at least partly in response to a determination, based at least in part on the biometric authentication and the at least one other form of authentication, that the first person has not been authenticated as the first user, deny the request to remove the security content recorded in the third party database, and transmit a notification regarding the denial of the request to remove the security content to one or more electronic destinations.

Optionally, the secure token comprises data items encrypted or hashed utilizing biometric data associated with the first user. Optionally, the encryption and data security system is configured to perform operations comprising: detect that a web browser hosted on a device of the first user has been navigated to a first web page associated with the encryption and data security system from a first referring source using data contained in a referrer header; access a token from the first referring source to obtain data regarding the first user and/or the first asset; and use the data regarding the first user and/or the first asset obtained using the token from the first referring source to populate one or more interface fields. Optionally, the encryption and data security system is configured to perform operations comprising: after causing the security content recorded in the third party database to be functionally removed, at least partly in response to an instruction from the first user, cause second security content to be recorded in the third party database in association with the first document evidencing ownership of the first asset. Optionally, the encryption and data security system is configured to perform operations comprising: detect a change in at least one third party database of an address related to the first asset; at least partly in response to detecting the change in at least one third party database of the address related to the first asset, generate a notification to the first user identifying the address change. Optionally, causing the security content recorded in the third party database to be functionally removed further comprises recording termination content in the third party database in association with the first document. Optionally, the encryption and data security system is configured to perform operations comprising encrypting data communications with a device of the first user. Optionally, the first asset comprises real property.

An aspect of the present disclosure relates to a computer-implemented method of securing data from unauthorized modification, the computer-implemented method comprising: receiving, at a computer system, a protection request for a first asset from a first user; generating, using the computer system, security content for the first asset; causing, using the computer system, the security content to be recorded in a third party database in association with a first document evidencing ownership of the first asset, the security content configured to inhibit an unauthorized recording of a second document; receiving, using the computer system, a request from a first person purporting to be the first user, the request comprising a request to remove the security content; performing an authentication procedure to determine whether the first person is the first user; at least partly in response to determining that the first person is the first user, causing the security content recorded in the third party database to be functionally removed and transmitting a notification regarding the functional removal of the security content to one or more electronic destinations; at least partly in response to determining that the first person has not been authenticated as the first user, denying the request to remove the security content recorded in the third party database, and transmitting a notification regarding the denial of the request to remove the security content to one or more electronic destinations.

Optionally, the computer-implemented method as defined in claim 9, the method further comprises: accessing a plurality of data items associated with the first asset; generating a secure token comprising an encryption and/or hash of at least a portion of the plurality of data items associated with the first asset; recording on a distributed, synchronized database, the secure token comprising the encryption and/or hash of at least a portion of the plurality of data items associated with the first asset. Optionally, the method further comprises: detecting that a web browser hosted on a device of the first user has been navigated to a first web page from a first referring source using data contained in a referrer header; accessing a token from the first referring source to obtain data regarding the first user and/or the first asset; and using the data regarding the first user and/or the first asset obtained using the token from the first referring source to populate one or more interface fields. Optionally, the method further comprises: after causing the security content recorded in the third party database to be functionally removed, at least partly in response to an instruction from the first user, causing second security content to be recorded in the third party database in association with the first document evidencing ownership of the first asset. Optionally, the method further comprises: detecting a change in at least one third party database of an address related to the first asset; at least partly in response to detecting the change in at least one third party database of the address related to the first asset, generating and transmitting a notification to the first user identifying the address change. Optionally, causing the security content recorded in the third party database to be functionally removed further comprises recording termination content in the third party database in association with the first document. Optionally, the method further comprises encrypting data communications with a device of the first user. Optionally, the method further comprises: generating a plurality of challenge questions based at least in part on data regarding the first asset; querying the first user using at least a portion of the plurality of challenge questions; based at least in part on user responses to one or more challenge questions, infer whether the first user owns the first asset; and at least partly in response to inferring that the first user owns the first asset, adding the first asset to an asset portfolio associated with the first user.

An aspect of the present disclosure relates to a computer-readable tangible medium that stores instructions, that when executed by a computing device, cause the computing device to perform operations comprising: receiving a protection request for a first asset from a first user; enabling, at least in part, security content for the first asset to be generated; enabling, at least in part, the security content to be recorded in a third party database in association with a first document evidencing ownership of the first asset, the security content configured to inhibit an unauthorized recording of a second document; receiving a request from a first person purporting to be the first user, the request comprising a request to remove the security content; causing, at least in part, an authentication procedure to be performed to determine whether the first person is the first user; at least partly in response to determining that the first person is the first user, enabling the security content recorded in the third party database to be functionally removed and transmitting a notification regarding the functional removal of the security content to one or more electronic destinations; at least partly in response to determining that the first person has not been authenticated as the first user, denying the request to remove the security content recorded in the third party database, and transmitting a notification regarding the denial of the request to remove the security content to one or more electronic destinations. Optionally, the operations further comprise: accessing a plurality of data items associated with the first asset; generating a secure token comprising an encryption and/or hash of at least a portion of the plurality of data items associated with the first asset; recording on a distributed, synchronized database, the secure token comprising the encryption and/or hash of at least a portion of the plurality of data items associated with the first asset. Optionally, the operations further comprise: detecting that a web browser hosted on a device of the first user has been navigated to a first web page from a first referring source using data contained in a referrer header; accessing a token from the first referring source to obtain data regarding the first user and/or the first asset; and using the data regarding the first user and/or the first asset obtained using the token from the first referring source to populate one or more interface fields. Optionally, the operations further comprise: after causing the security content recorded in the third party database to be functionally removed, at least partly in response to an instruction from the first user, causing second security content to be recorded in the third party database in association with the first document evidencing ownership of the first asset. Optionally, the operations further comprise: detecting a change in at least one third party database of an address related to the first asset; at least partly in response to detecting the change in at least one third party database of the address related to the first asset, generating and transmitting a notification to the first user identifying the address change. Optionally, causing the security content recorded in the third party database to be functionally removed further comprises recording termination content in the third party database in association with the first document. Optionally, the operations further comprise encrypting data communications with a device of the first user. Optionally, the operations further comprise: generating a plurality of challenge questions based at least in part on data regarding the first asset; querying the first user using at least a portion of the plurality of challenge questions; based at least in part on user responses to one or more challenge questions, infer whether the first user owns the first asset; and at least partly in response to inferring that the first user owns the first asset, adding the first asset to an asset portfolio associated with the first user.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications/alerts and user interfaces described herein may be provided via a Web page, a dedicated or non-dedicated phone application, computer application, a short messaging service message (e.g., SMS, MMS, etc.), instant messaging, email, push notification, audibly, a pop-up interface, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. An encryption and data security system, comprising:
    a network interface;
    at least one processing device operable to:
        receive, via the network interface, a protection request for a first asset from a first user;
        access a plurality of data items associated with the first asset;
        generate a secure token comprising an encryption and/or hash of at least a portion of the plurality of data items associated with the first asset;
        record on a distributed, synchronized database, the secure token comprising the encryption and/or hash of at least a portion of the plurality of data items associated with the first asset;
        generate security content for the first asset;
        cause the security content to be recorded in a third party database in association with a first document evidencing ownership of the first asset, to thereby inhibit an unauthorized recording of a second document evidencing ownership of the first asset;
        receive a request from a first person purporting to be the first user, the request comprising a request to remove the security content;
        utilize biometric authentication and at least one other form of authentication to determine whether the first person is the first user;
        at least partly in response to a determination, based at least in part on the biometric authentication and the at least one other form of authentication, that the first person is the first user,
        cause the security content recorded in the third party database to be functionally removed and transmit a notification regarding the functional removal of the security content to one or more electronic destinations;
        at least partly in response to a determination, based at least in part on the biometric authentication and the at least one other form of authentication, that the first person has not been authenticated as the first user,
        deny the request to remove the security content recorded in the third party database, and
        transmit a notification regarding the denial of the request to remove the security content to one or more electronic destinations.

2. The encryption and data security system as defined in claim 1, wherein the secure token comprises data items encrypted or hashed utilizing biometric data associated with the first user.

3. The encryption and data security system as defined in claim 1, wherein the encryption and data security system is configured to perform operations comprising:
    detect that a web browser hosted on a device of the first user has been navigated to a first web page associated with the encryption and data security system from a first referring source using data contained in a referrer header;
    access a token from the first referring source to obtain data regarding the first user and/or the first asset; and
    use the data regarding the first user and/or the first asset obtained using the token from the first referring source to populate one or more interface fields.

4. The encryption and data security system as defined in claim 1, wherein the encryption and data security system is configured to perform operations comprising:
    after causing the security content recorded in the third party database to be functionally removed, at least partly in response to an instruction from the first user, cause second security content to be recorded in the third party database in association with the first document evidencing ownership of the first asset.

5. The encryption and data security system as defined in claim 1, wherein the encryption and data security system is configured to perform operations comprising:
    detect a change in at least one third party database of an address related to the first asset;
    at least partly in response to detecting the change in at least one third party database of the address related to the first asset, generate a notification to the first user identifying the address change.

6. The encryption and data security system as defined in claim 1, wherein causing the security content recorded in the third party database to be functionally removed further comprises recording termination content in the third party database in association with the first document.

7. The encryption and data security system as defined in claim 1, wherein the encryption and data security system is configured to perform operations comprising encrypting data communications with a device of the first user.

8. The encryption and data security system as defined in claim 1, wherein the first asset comprises real property.

9. A computer-implemented method of securing data from unauthorized modification, the computer-implemented method comprising:
  receiving, at a computer system, a protection request for a first asset from a first user;
  generating, using the computer system, security content for the first asset;
  causing, using the computer system, the security content to be recorded in a third party database in association with a first document evidencing ownership of the first asset, the security content configured to inhibit an unauthorized recording of a second document;
  receiving, using the computer system, a request from a first person purporting to be the first user, the request comprising a request to remove the security content;
  performing an authentication procedure to determine whether the first person is the first user;
  at least partly in response to determining that the first person is the first user,
  causing the security content recorded in the third party database to be functionally removed and transmitting a notification regarding the functional removal of the security content to one or more electronic destinations;
  at least partly in response to determining that the first person has not been authenticated as the first user,
  denying the request to remove the security content recorded in the third party database, and
  transmitting a notification regarding the denial of the request to remove the security content to one or more electronic destinations.

10. The computer-implemented method as defined in claim 9, the method further comprising:
  accessing a plurality of data items associated with the first asset;
  generating a secure token comprising an encryption and/or hash of at least a portion of the plurality of data items associated with the first asset;
  recording on a distributed, synchronized database, the secure token comprising the encryption and/or hash of at least a portion of the plurality of data items associated with the first asset.

11. The computer-implemented method as defined in claim 9, the method further comprising:
  detecting that a web browser hosted on a device of the first user has been navigated to a first web page from a first referring source using data contained in a referrer header;
  accessing a token from the first referring source to obtain data regarding the first user and/or the first asset; and
  using the data regarding the first user and/or the first asset obtained using the token from the first referring source to populate one or more interface fields.

12. The computer-implemented method as defined in claim 9, the method further comprising:
  after causing the security content recorded in the third party database to be functionally removed, at least partly in response to an instruction from the first user, causing second security content to be recorded in the third party database in association with the first document evidencing ownership of the first asset.

13. The computer-implemented method as defined in claim 9, the method further comprising:
  detecting a change in at least one third party database of an address related to the first asset;
  at least partly in response to detecting the change in at least one third party database of the address related to the first asset, generating and transmitting a notification to the first user identifying the address change.

14. The computer-implemented method as defined in claim 9, wherein causing the security content recorded in the third party database to be functionally removed further comprises recording termination content in the third party database in association with the first document.

15. The computer-implemented method as defined in claim 9, the method further comprising encrypting data communications with a device of the first user.

16. The computer-implemented method as defined in claim 9, the method further comprising:
  generating a plurality of challenge questions based at least in part on data regarding the first asset;
  querying the first user using at least a portion of the plurality of challenge questions;
  based at least in part on user responses to one or more challenge questions, infer whether the first user owns the first asset; and
  at least partly in response to inferring that the first user owns the first asset, adding the first asset to an asset portfolio associated with the first user.

17. A non-transitory computer-readable medium that stores instructions, that when executed by a computing device, cause the computing device to perform operations comprising:
  receiving a protection request for a first asset from a first user;
  enabling, at least in part, security content for the first asset to be generated;
  enabling, at least in part, the security content to be recorded in a third party database in association with a first document evidencing ownership of the first asset, the security content configured to inhibit an unauthorized recording of a second document;
  receiving a request from a first person purporting to be the first user, the request comprising a request to remove the security content;
  causing, at least in part, an authentication procedure to be performed to determine whether the first person is the first user;
  at least partly in response to determining that the first person is the first user,
  enabling the security content recorded in the third party database to be functionally removed and transmitting a notification regarding the functional removal of the security content to one or more electronic destinations;
  at least partly in response to determining that the first person has not been authenticated as the first user,
  denying the request to remove the security content recorded in the third party database, and
  transmitting a notification regarding the denial of the request to remove the security content to one or more electronic destinations.

18. A non-transitory computer-readable medium as defined in claim 17, the operations further comprising:

accessing a plurality of data items associated with the first asset;

generating a secure token comprising an encryption and/or hash of at least a portion of the plurality of data items associated with the first asset;

recording on a distributed, synchronized database, the secure token comprising the encryption and/or hash of at least a portion of the plurality of data items associated with the first asset.

19. A non-transitory computer-readable medium as defined in claim 17, the operations further comprising:

detecting that a web browser hosted on a device of the first user has been navigated to a first web page from a first referring source using data contained in a referrer header;

accessing a token from the first referring source to obtain data regarding the first user and/or the first asset; and using the data regarding the first user and/or the first asset obtained using the token from the first referring source to populate one or more interface fields.

20. A non-transitory computer-readable medium as defined in claim 17, the operations further comprising:

after causing the security content recorded in the third party database to be functionally removed, at least partly in response to an instruction from the first user, causing second security content to be recorded in the third party database in association with the first document evidencing ownership of the first asset.

21. A non-transitory computer-readable medium as defined in claim 17, the operations further comprising:

detecting a change in at least one third party database of an address related to the first asset;

at least partly in response to detecting the change in at least one third party database of the address related to the first asset, generating and transmitting a notification to the first user identifying the address change.

22. A non-transitory computer-readable medium as defined in claim 17, wherein causing the security content recorded in the third party database to be functionally removed further comprises recording termination content in the third party database in association with the first document.

23. A non-transitory computer-readable medium as defined in claim 17, the operations further comprising encrypting data communications with a device of the first user.

24. A non-transitory computer-readable medium as defined in claim 17, the operations further comprising:

generating a plurality of challenge questions based at least in part on data regarding the first asset;

querying the first user using at least a portion of the plurality of challenge questions;

based at least in part on user responses to one or more challenge questions, infer whether the first user owns the first asset; and at least partly in response to inferring that the first user owns the first asset, adding the first asset to an asset portfolio associated with the first user.

* * * * *